US012770529B1

(12) United States Patent
Gloyd

(10) Patent No.: US 12,770,529 B1
(45) Date of Patent: Oct. 20, 2026

(54) BLENDED TEACHING METHOD

(71) Applicant: Class Bucks LLC, Albuquerque, NM (US)

(72) Inventor: Peter Jonathan Gloyd, Albuquerque, NM (US)

(73) Assignee: Class Bucks LLC, Albuquerque, NM (US)

( * ) Notice: Subject to any disclaimer, the term of this patent is extended or adjusted under 35 U.S.C. 154(b) by 19 days.

(21) Appl. No.: 18/604,207

(22) Filed: Mar. 13, 2024

Related U.S. Application Data

(63) Continuation-in-part of application No. 17/334,462, filed on May 28, 2021, now abandoned.

(60) Provisional application No. 62/704,815, filed on May 29, 2020.

(51) Int. Cl.

| | |
|---|---|
| ***G09B 7/02*** | (2006.01) |
| ***G09B 5/10*** | (2006.01) |
| *G06Q 50/20* | (2012.01) |
| *G09B 5/00* | (2006.01) |
| *G09B 5/14* | (2006.01) |

(52) U.S. Cl.
CPC ................. *G09B 7/02* (2013.01); *G09B 5/10* (2013.01); *G06Q 50/20* (2013.01); *G09B 5/00* (2013.01); *G09B 5/14* (2013.01)

(58) Field of Classification Search
CPC ... G09B 7/02; G09B 5/10; G09B 7/00; G09B 5/14; G09B 5/00; G06Q 50/20
See application file for complete search history.

(56) References Cited

U.S. PATENT DOCUMENTS

| | | | | |
|---|---|---|---|---|
| 5,002,491 | A | 3/1991 | Abrahamson et al. | |
| 5,035,625 | A | 7/1991 | Munson et al. | |
| 5,263,869 | A | 11/1993 | Ziv-El | |
| 5,344,326 | A | 9/1994 | Ferris | |
| 5,823,788 | A | 10/1998 | Lemelson et al. | |
| 5,957,699 | A | 9/1999 | Peterson et al. | |
| 6,064,856 | A | 5/2000 | Lee et al. | |
| 6,141,529 | A | 10/2000 | Remschel | |
| 6,164,974 | A | 12/2000 | Carlile et al. | |
| 6,302,698 | B1 * | 10/2001 | Ziv-El ...................... | G09B 7/02 434/350 |
| 6,685,476 | B1 | 2/2004 | Safran | |
| 6,885,844 | B2 | 4/2005 | Roschelle et al. | |
| 6,898,411 | B2 | 5/2005 | Ziv-El et al. | |
| 9,349,298 | B2 | 5/2016 | Okamoto et al. | |
| 9,581,962 | B1 * | 2/2017 | Duffy ................. | G06Q 30/0269 |
| 9,623,333 | B2 | 4/2017 | Pattison et al. | |
| 10,043,410 | B1 | 8/2018 | Swank et al. | |

(Continued)

*Primary Examiner* — Jack Yip
(74) *Attorney, Agent, or Firm* — Peacock Law P.C.; Justin R. Jackson; Daniel Berenger-Russell

(57) ABSTRACT

A blended teaching method wherein an instructor provides live, in-person, instruction to a plurality of students, at least periodically displaying an action instruction to the plurality of students on an electronically-updatable class display that is visible by the plurality of students, the plurality of students communicating with the instructor via a respective one of a plurality of participant devices, the plurality of students performing an action on their respective one of the plurality of participant devices, which action corresponds to the displayed action instruction, and an instructor display at least periodically viewable by the instructor, displaying communications from the plurality of students.

19 Claims, 15 Drawing Sheets

(56) References Cited

U.S. PATENT DOCUMENTS

| | | | | |
|---|---|---|---|---|
| 10,332,412 | B2 | 6/2019 | Swank et al. | |
| 10,423,929 | B2 | 9/2019 | Masood et al. | |
| 10,510,265 | B2 | 12/2019 | Jiao et al. | |
| 11,216,785 | B2 | 1/2022 | Hudson et al. | |
| 11,276,319 | B2 | 3/2022 | O'Sullivan | |
| 11,276,320 | B2 | 3/2022 | O'Sullivan | |
| 11,276,322 | B2 | 3/2022 | O'Sullivan | |
| 11,721,229 | B2 | 8/2023 | Shi et al. | |
| 2010/0004977 | A1* | 1/2010 | Marci | H04N 21/44218 705/7.32 |
| 2010/0331075 | A1 | 12/2010 | Michelstein et al. | |
| 2011/0004934 | A1 | 1/2011 | Beylerian | |
| 2011/0102142 | A1* | 5/2011 | Widger | H04N 7/18 340/5.83 |
| 2011/0256520 | A1* | 10/2011 | Siefert | G06V 40/70 434/322 |
| 2012/0270661 | A1 | 10/2012 | Smith et al. | |
| 2013/0079128 | A1 | 3/2013 | Thomas et al. | |
| 2013/0211238 | A1 | 8/2013 | Decharms | |
| 2014/0272830 | A1* | 9/2014 | Taher | G09B 5/08 434/219 |
| 2014/0274413 | A1 | 9/2014 | Chelst | |
| 2015/0213722 | A1 | 7/2015 | Nypl et al. | |
| 2017/0358232 | A1* | 12/2017 | Adams | A61B 5/1118 |
| 2018/0300830 | A1* | 10/2018 | Darnell | G06F 18/24 |
| 2020/0153915 | A1* | 5/2020 | Jain | H04L 67/535 |
| 2021/0073673 | A1* | 3/2021 | Janakiraman | G06V 30/1916 |
| 2021/0272467 | A1* | 9/2021 | Yang | G06Q 50/20 |
| 2023/0045013 | A1* | 2/2023 | Ruiters | G06Q 50/205 |

* cited by examiner

BLENDED TEACHING METHOD

CROSS-REFERENCE TO RELATED APPLICATIONS

This application is a continuation-in-part patent application of U.S. patent application Ser. No. 17/334,462, entitled "Decision-Making Incentive and Evaluation System", filed on May 28, 2021, which itself claims priority to and the benefit of the filing of U.S. Provisional Patent Application No. 62/704,815, entitled "Decision-Making Incentive & Evaluation System", filed on May 29, 2020, and the specifications and claims, if any, thereof is incorporated herein by reference.

BACKGROUND OF THE INVENTION

Field of the Invention

Embodiments of the present invention relate to educational software systems, namely, systems and methods of data collection, data analysis and data reporting to encourage positive outcomes and discourage negative outcomes.

Background

Note that the following discussion may refer to existing technologies that are not to be considered as prior art vis-a-vis the present invention. Discussion of any existing technologies herein is given for more complete background and is not to be construed as an admission that such publications are prior art for patentability determination purposes.

Disengagement, misbehavior and low performance is a rampant problem in educational settings. Educators are overloaded with work and struggle to manage the classroom. To make matters worse, parent-teacher communication is irregular and infrequent, parents and the community at large are not engaged with student education. Many educational institutions do not use technology to engage students.

Financial literacy is not ordinarily taught in schools, and the effects of the lack of financial literacy is apparent in the economy and the day-to-day life of people all around the world. Financial literacy is not easily taught because it is complex, cultural and highly experiential.

Currently available systems do not provide financial literacy gamification and/or are fantasy-based as opposed to based on real-world conditions. Typical learning management systems are not interactive, lack automation of certain key functions, and lack functions that permit community engagement or the engagement of other users or observers (such as parents of students). Some educators have tried to teach financial literacy by creating manual classroom economies, but such systems are time consuming, difficult if not impossible to manage and are not truly interactive. Individual tools are not comprehensive enough and/or too specialized. For example, some software applications assist parents and their children in managing chores, but such systems are not integral with educational processes or institutions and are narrowly tailored. Very few if any of existing learning management systems provide an effective, efficient and accurate way of measuring engagement and measuring, analyzing and reporting metrics.

What is needed is a learning management system that employs interactive gamification to simulate a real-world financial theme. To accomplish this, certain processes of obtaining certain data from certain devices in a certain order and applying certain data transformations based on certain factors are described herein.

BRIEF SUMMARY OF EMBODIMENTS OF THE PRESENT INVENTION

Embodiments of the present invention employ certain devices and processes to provide a learning management system that incentivizes and disincentives the conduct of a participant within an interactive game, and that reports and evaluates the engagement, understanding, wellness, of the participant with the lesson plan.

Embodiments of the present invention are directed to a system comprising: a facilitator control device and a participant device, both in communication with a database, wherein: the facilitator control device comprises at least one computer processor and at least one memory resource storing instructions that, when executed by the at least one computer processor, causes the facilitator control device to store, in the database, engagement assessment information, understanding assessment information, wellness assessment information, chance game element information, criteria-based game element information and participant transaction opportunity information, the engagement assessment information comprising information related to the content and duration of a stimulus to be displayed on the participant device, the stimulus requesting a response from the participant device within the duration, the understanding assessment information comprising information related to the content and duration of a prompt to be displayed on the participant device, the content of the prompt related to a lesson plan, the wellness assessment information comprising information related to the content and time of a poll to be displayed on the participant device, the content of the poll related to human wellness, the chance game element information comprising information related to at least one game asset stored in the database, each game asset comprising information related to a game asset location and a game asset location value, the criteria-based game element information comprising information related to a condition that is either satisfied or not satisfied, the participant transaction opportunity information comprising information related to the time, duration and content of a choice to be displayed on the participant device related to the at least one game asset stored in the database; the database comprises at least one computer processor and at least one memory resource storing instructions that, when executed by the at least one computer processor, causes the database to communicate the stimulus, prompt, poll, or choice to the participant device; the participant device comprises at least one computer processor and at least one memory resource storing instructions that, when executed by the at least one computer processor, causes the participant device to communicate to the database a response to the stimulus, prompt, poll, or choice (each, a "participant response") wherein the participant response comprises a response value, response time, and participant identifier; and the database generates: a participant game location for each participant identifier, the participant game location associated with one of the at least one game assets and based on the chance game element information, a feedback value associated with the participant response, wherein the feedback value comprises a positive or negative value, a condition value associated with the condition, wherein the condition value comprises either a positive or negative value, a participant score for a given participant identifier that is the sum of feedback values and condition values for that given participant identifier; and a report comprising the participant score.

In some embodiments of the system, the game asset location value is based at least in part on the condition value. In another embodiment, the choice of the participant transaction opportunity information relates to a reward, bonus, fee, penalty, availability to purchase a game asset, or availability to sell a game asset. In another embodiment, the participant game location is based at least in part on the participant score. In another embodiment, the participant score is based at least in part on the participant game location value. In another embodiment, the participant game location is based at least in part on the participant response. In another embodiment, the report further comprises information related to the participant response for a given participant identifier. In another embodiment, the system also comprises an interested party device in communication with the database, and the database sends the report to the interested party device. In another embodiment, the database generates a participant score conversion value, the participant score conversion value being based on a ratio of the participant score to a real-world currency, value of a physical object, reward or participant score of a different participant identifier. In another embodiment, the condition comprises information related to a start time, and wherein the participant response communicates a check-in time to the database comprising the time the participant device is engaged with the system, and wherein the database generates the condition value to be a negative value if the check-in time is later than the start time. In another embodiment, the database generates a participant response penalty value that is negative if the response time is later than any duration of the participant response stored in the database, and generates the participant score based at least in part on the participant response penalty value.

In one embodiment, the engagement assessment information comprises information related to a start time and an end time, and the database generates a random time between the start time and end time, and communicates the stimulus to the participant device at the random time. In another embodiment, the system further comprises a facilitator presentation device comprising at least one computer processor and at least one memory resource storing instructions that, when executed by the at least one computer processor, causes the facilitator presentation device to communicate with both the facilitator control device and the database, and to display the stimulus, prompt, poll, or choice. In another embodiment, the database generates a group identifier relating to both of the facilitator control device and the participant device, and stores the group identifier with each of the engagement assessment information, the understanding assessment information, the wellness assessment information, the chance game element information, the criteria-based game element information, the participant transaction opportunity information, and the participant response.

In one embodiment, the system further comprises a second facilitator control device, and the database generates a second group identifier relating to the second facilitator control device and the participant device, and the database stores the second group identifier with each of the engagement assessment information, the understanding assessment information, the wellness assessment information, the chance game element information, the criteria-based game element information and the participant transaction opportunity information received from the second facilitator device. In another embodiment, the database stores location data related to the participant device from one of the group consisting of: a scannable code associated with a physical location received from the participant device; Global Position System data related to the geolocation of the participant device received from the participant device; and data related to the location of the participant device received from the facilitator control device. In another embodiment, the database communicates instructions to the participant device that cause the participant device to display only that information related to the system and to block from the display other software not related to the system that is not related to the operating system of the participant device.

In another embodiment of the system, the game asset location value is based at least in part on the condition value; the choice of the participant transaction opportunity information relates to a reward, bonus, fee, penalty, availability to purchase a game asset, or availability to sell a game asset; the participant score is based at least in part on the participant game location value; the database generates a participant score conversion value, the participant score conversion value being based on a ratio of the participant score to a real-world currency, value of a physical object, reward or participant score of a different participant identifier; the condition comprises information related to a start time; the participant response communicates a check-in time to the database comprising the time the participant device is engaged with the system; the database generates the condition value to be a negative value if the check-in time is later than the start time; the database generates a participant response penalty value that is negative if the response time is later than any duration of the participant response stored in the database, and generates the participant score based at least in part on the participant response penalty value; the engagement assessment information comprises information related to a start time and an end time, and the database generates a random time between the start time and end time, and communicates the stimulus to the participant device at the random time; and the database generates a group identifier relating to both of the facilitator control device and the participant device, and stores the group identifier with each of the engagement assessment information, the understanding assessment information, the wellness assessment information, the chance game element information, the criteria-based game element information, the participant transaction opportunity information, and the participant response.

Embodiments of the present invention are also directed to a method being performed by one or more computer processors in a facilitator control device, participant device and database, the method comprising: storing, in the database, engagement assessment information, understanding assessment information, wellness assessment information, chance game element information, criteria-based game element information and participant transaction opportunity information, the engagement assessment information comprising information related to the content and duration of a stimulus to be displayed on the participant device, the stimulus requesting a response from the participant device within the duration, the understanding assessment information comprising information related to the content and duration of a prompt to be displayed on the participant device, the content of the prompt related to a lesson plan, the wellness assessment information comprising information related to the content and time of a poll to be displayed on the participant device, the content of the poll related to human wellness, the chance game element information comprising information related to at least one game asset stored in the database, each game asset comprising information related to a game asset location and a game asset location value, the criteria-based game element information comprising information related to a condition that is either satisfied or not satisfied, the participant transaction opportunity information comprising information related to the time, duration and content of a choice to be displayed on the participant device related to the at least one game asset stored in the database; communicating the stimulus, prompt, poll, or choice to the participant device; communicating a response to the stimulus, prompt, poll, or choice (each, a "participant response") to the database, wherein the participant response comprises a response value, response time, and participant identifier; and generating and storing in the database: a participant game location for each participant identifier, the participant game location associated with one of the at least one game assets and based on the chance game element information, a feedback value associated with the participant response, wherein the feedback value comprises a positive or negative value, a condition value associated with the condition, wherein the condition value comprises either a positive or negative value, a participant score for a given participant identifier that is the sum of feedback values and condition values for that given participant identifier; and a report comprising the participant score.

Embodiments of the present invention are also directed to a non-transitory computer-readable medium that stores instructions, executable by one or more processors, to cause the one or more processors to perform operations that comprise: storing, in the database, engagement assessment information, understanding assessment information, wellness assessment information, chance game element information, criteria-based game element information and participant transaction opportunity information, the engagement assessment information comprising information related to the content and duration of a stimulus to be displayed on the participant device, the stimulus requesting a response from the participant device within the duration, the understanding assessment information comprising information related to the content and duration of a prompt to be displayed on the participant device, the content of the prompt related to a lesson plan, the wellness assessment information comprising information related to the content and time of a poll to be displayed on the participant device, the content of the poll related to human wellness, the chance game element information comprising information related to at least one game asset stored in the database, each game asset comprising information related to a game asset location and a game asset location value, the criteria-based game element information comprising information related to a condition that is either satisfied or not satisfied, the participant transaction opportunity information comprising information related to the time, duration and content of a choice to be displayed on the participant device related to the at least one game asset stored in the database; communicating the stimulus, prompt, poll, or choice to the participant device; communicating a response to the stimulus, prompt, poll, or choice (each, a "participant response") to the database, wherein the participant response comprises a response value, response time, and participant identifier; and generating and storing in the database: a participant game location for each participant identifier, the participant game location associated with one of the at least one game assets and based on the chance game element information, a feedback value associated with the participant response, wherein the feedback value comprises a positive or negative value, a condition value associated with the condition, wherein the condition value comprises either a positive or negative value, a participant score for a given participant identifier that is the sum of feedback values and condition values for that given participant identifier; and a report comprising the participant score.

Embodiments of the present invention also relate to a blended teaching method, the method including an instructor providing live, in-person, instruction to a plurality of students, at least periodically displaying an action instruction to the plurality of students on an electronically-updatable class display that is visible by the plurality of students, the plurality of students communicating with the instructor via a respective one of a plurality of participant devices, the plurality of students performing an action on their respective one of the plurality of participant devices, which action corresponds to the displayed action instruction, and an instructor display, at least periodically viewable by the instructor, displaying communications from the plurality of students. The step of at least periodically displaying an action instruction to the plurality of students can include automatically displaying a predefined action instruction. The method can also include capturing inputs from the plurality of students performing the action and making a determination of whether one or more of the plurality of students are paying attention. The method can also include updating indicia of a level of class attention based on determinations of whether the one or more of the plurality of students are paying attention. The method can include the instructor display displaying student attention. At least periodically displaying an action instruction to the plurality of students on an electronically-updatable class display can include at least periodically displaying an action instruction to the plurality of students on a smart board.

The blended teaching method can include the plurality of participant devices using an application or a web service that enables user inputs from each respective one of the plurality of participant devices to be reported to an instructor display and/or otherwise stored in a database. The method can include using an application installed on at least some of the plurality of participant devices. The method can include software as a service for capturing information from at least some of the plurality of participant devices. The plurality of students communicating with the instructor via a respective one of a plurality of participant devices can include the plurality of students communicating with the instructor via a respective one of a plurality of smartphones.

The method can be implemented at least partially via computer software stored in a non-transitive computer readable media such that data is collected from the plurality of participant devices and a database is updated and such that data from the database is presented on the instructor display. The software can cause the electronically-updatable class display to at least periodically display the action instructions. The method can also include computer software stored in a non-transitive computer readable media which facilitates communications between the plurality of participant devices, the electronically-updatable class display and the instructor display.

In the method, at least periodically displaying an action instruction can include an instructor initiating the display of an action instruction. The method can also include displaying indicia on the electronically-updatable class display and the plurality of students each using the respective one of the plurality of participant devices to obtain an image of the indicia or to otherwise scan the indicia and can include making a determination that a respective student is in attendance based on the image or the scan. Optionally, displaying indicia can include displaying a first indicia for less than five seconds before then displaying a second indicia, the first indicia being different from the second indicia. Optionally, making a determination that a respective student is in attendance can include determining whether the image or scan corresponds to indicia that is currently-displayed on the electronically-updatable class display. The method can include electronically awarding tokens to at least one of the plurality of students in response to answering a question correctly. The method can also include maintaining a running balance of tokens held by each respective one of the plurality of students. The method can include allowing each of the plurality of students to transfer one or more tokens from the student's respective running balance of tokens to a running balance of tokens held by a different student.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1A:
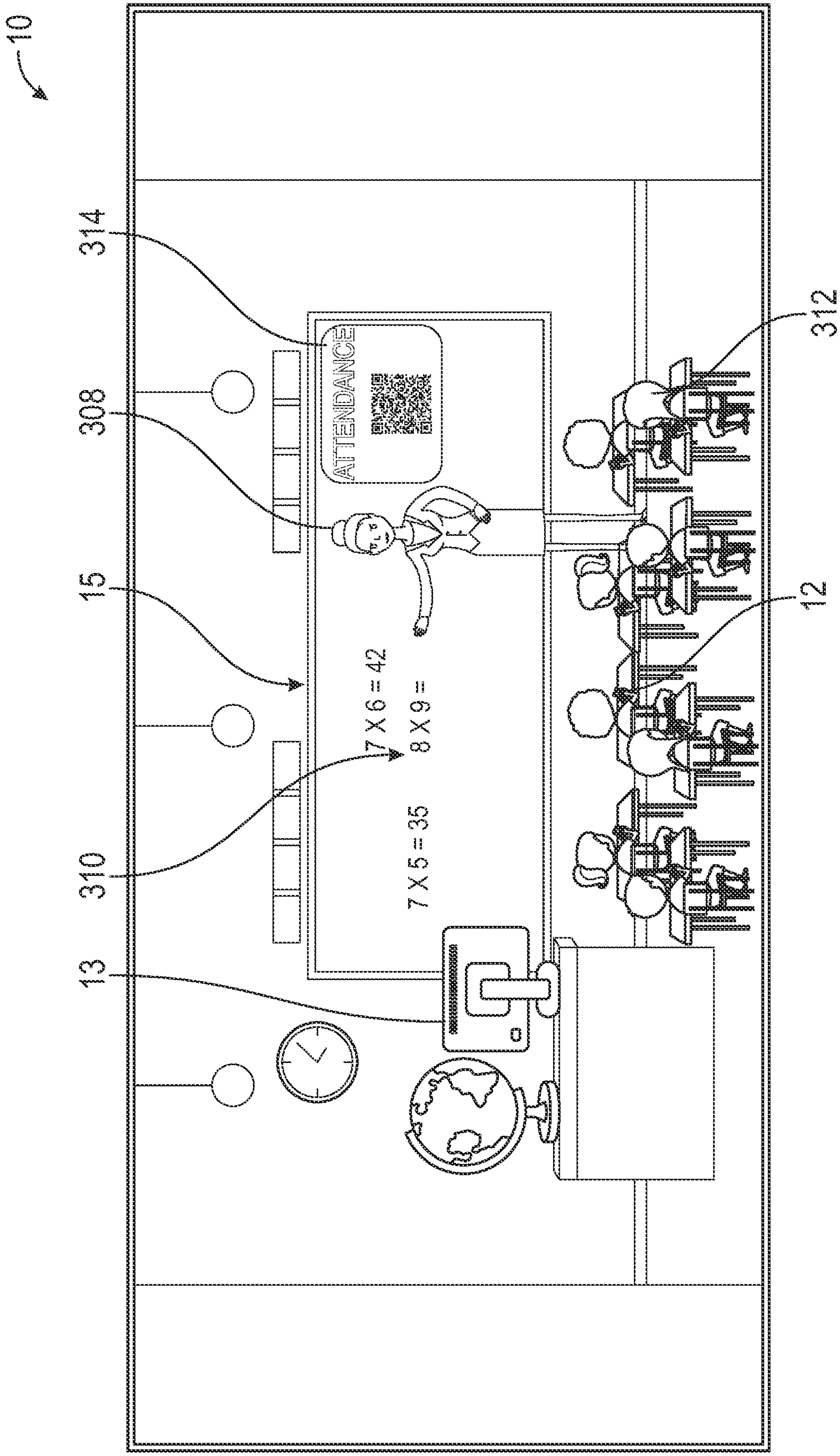
FIG. 1A is a drawing which illustrates an embodiment of the present invention in use in a classroom of students.
Figure 1B:
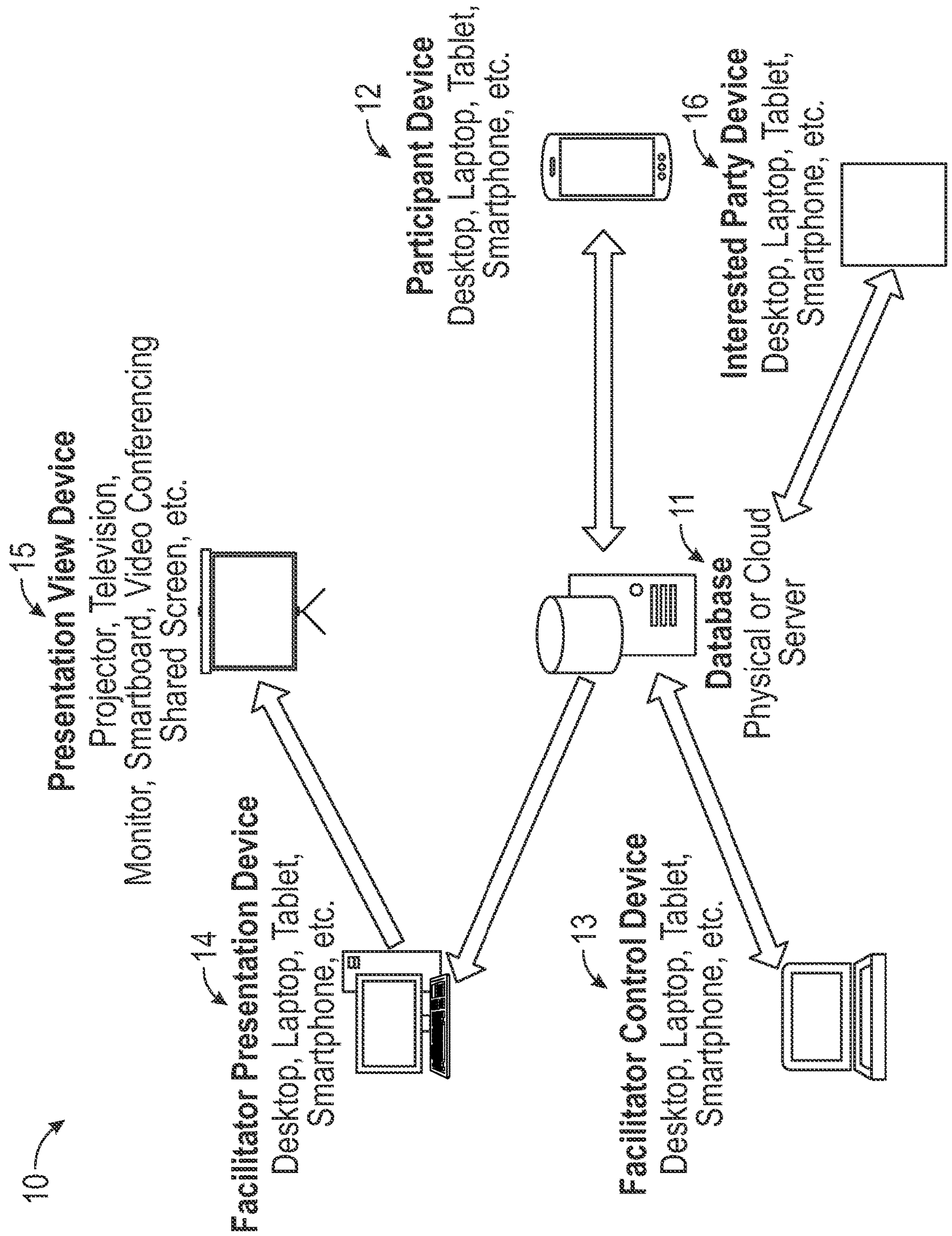
FIG. 1B is a schematic flow chart illustrating the various devices of a system and flow of communication between them according to an embodiment of the present invention.

Embodiments of the decision-making incentive and evaluation system 10 of the present invention provide an incentive system that a facilitator of a learning management system can use to motivate or encourage a participant in a physical classroom, virtual setting, training session, home environment or other to produce good decisions and positive outcomes. Preferably, participants earn and accumulate points or virtual currency that can be exchanged for privileges, assets, prizes, allowances, pardons, or other items. Participants are provided the opportunity to invest in virtual cryptocurrency, stocks, bonds, funds, real estate, savings accounts, CDs or other investment types to potentially gain more points, currency or assets while risking the loss of points, currency or assets. Features of system 10 also permit participants to exchange their assets with the facilitator, the system or other participants for other assets. At points throughout the experience, rewards and awards can be granted by the facilitator and/or generated by the invention. System 10 preferably generates reports displaying participant status, behavior, effort, performance, engagement and other measurables. An analysis of these measures is preferably included in the reports. The reports are preferably sent automatically to the facilitator, participant and interested parties. Frequency and time span of the reports are preferably adjustable.

System 10 also permits interested parties, including but not limited to parents, guardians, or supervisors of a participant, to transfer points or virtual currency earned in a facilitated experience to real currency or some other point or reward scale. Embodiments of the present invention allow for interested parties to designate an exchange rate. Interested parties can use system 10 to manage their own currency, point or reward scale with the participant. System 10 preferably permits interested parties to assign currency, points or rewards in exchange for tasks, positive behavior, good choices or other desired outcomes.

The details of how these features are accomplished by system 10, with its devices, processes and data architecture, are described herein with reference to the figures.

For purposes of this application, the following terms are sometimes used to describe system 10. Their meaning shall be interpreted as broadly as possible in light of their context of use and their definition as would be understood by a person of ordinary skill in the art. The term "facilitator" shall mean a user of system 10 that uses facilitator control device 13, including but not limited to a teacher, trainer, employer, coach, instructor, professor, supervisor, mentor, parent, etc. a teacher, professor, trainer, instructor, parent, or other. The term "participant" shall mean any user of system 10 that uses participant device 12, including but not limited to a student, trainee, employee, player, apprentice, subordinate, understudy, child, etc. The term "interested party" shall mean any user of system 10 that uses interested party device 16, including a parent, guardian, advisor, mentor, coach, college/university, employer, scholarship, award, etc., of a participant. The term "wellness" shall mean any state of being related to physical or mental wellness, including but not limited to social, emotional, medical, and/or health status. The term "interaction" shall include a lesson, segment of instruction, class, meeting, seminar, training, practice, etc. The term "activity" shall include a portion of the interaction, exercise, activity, lecture, assignment, scavenger hunt, etc. The term "experience" shall mean the participant's use of system 10, including as related to a game or interface with system 10. The term "group" shall mean any categorization of participants, interested parties, facilitators, or persons generally, including a class, team, group, subgroup, department, etc. The term "organization" shall include any school, business, university/college, team, club, organization, group, etc. The term "entity" shall include a sponsor, company, individual, locality, nationality, etc. The term "rounds" shall mean short term periods of the experience during an interaction, and in which participants can compete as individuals and/or as a group. The term "levels" shall include achievements, statuses, rewards, recognition, honors, badges that participants and/or groups can earn throughout the short- or long-term portion of the experience. The term "checkpoints" shall include time marks, landmarks throughout an interaction that assist facilitators with pacing and opportunities for measurements, assessments or experience features. The term "gameboard" shall include the physical layout of class, office or some other facility or virtual layout of participant landing spots for each interaction. The term "location" shall include facilitator seating, physical desk, chair, table, office, virtual affiliation within the experience for the current interaction. Locations may have features, properties, entities, groups, bonuses, rewards, implications, settings, characteristics, attributes, logos, colors, designs, or other elements associated with them. The term "leaderboard" shall include an individual, group, organization, entity, city, county, state, nationality, international standings based on performance, behavior, attendance, engagement, earnings, spending, ownership, overall, composite formula, adjusted, weighted, unweighted. The term "prizes" shall include privileges, rewards, items related to the experience or group or organization set forth by the facilitator. The term "transaction time" shall include time for participants to redeem points or currency in exchange for prizes or assets. The term "assets" shall include virtual gameboard locations or other items that participants can gain access to by point or currency redemption.

One of the objectives of decision-making incentive and evaluation system 10 is to measure student engagement, behavior, performance, understanding, retention, social emotional wellness, teacher effectiveness, and lesson effectiveness, as will be described further herein. Referring now to the figures, embodiments of decision-making incentive and evaluation system 10 according to the present invention preferably comprise database 11, participant device 12, facilitator control device 13, facilitator presentation device 14, presentation view device 15 and interested party device 16. Such devices are preferably computer devices comprising at least one computer processor and at least one memory resource with instructions to carry out the processes described herein and/or store the information described herein, including but not limited to mobile computer devices, smart phones, laptop computers, desktop computers, tablet computer, server computers, etc. Preferably, database 11 comprises a computer server in communication with participant device 12 and facilitator control device 13 over a network, which network is preferably any network that can connect computers in communication, including but not limited to local area networks, personal area networks, wireless local area networks, virtual private networks and/or the internet generally etc., and as may be used to provide access as a software-as-a-service, for example. System 10 preferably comprises one facilitator presentation device 14, one database 11 and a plurality of participant devices 12, but other embodiments of system 10 can comprise any number of facilitator presentation devices 14, databases 11 and participant devices 12. Presentation view device 15 is preferably a device capable of displaying content on a screen visible by numerous people in a room, including but not limited to a projector and screen, television, monitor, smartboard, shared screen in video conferencing session, etc. In some embodiments, a single computer can serve the function of more than one of the devices. For example, in one embodiment, facilitator presentation device 14 and presentation view device 15 are the same device, that is, they share the same computer processors and memory components.

Preferably database 11, facilitator control device 13, participant device 12, facilitator presentation device 14, presentation view device 15 and/or interested party device 16 comprise instructions to operate engagement assessment process 20, understanding assessment process 30, and wellness assessment process 40, as described further herein. Other processes are also described herein, including in the examples provided below.

Figure 2:
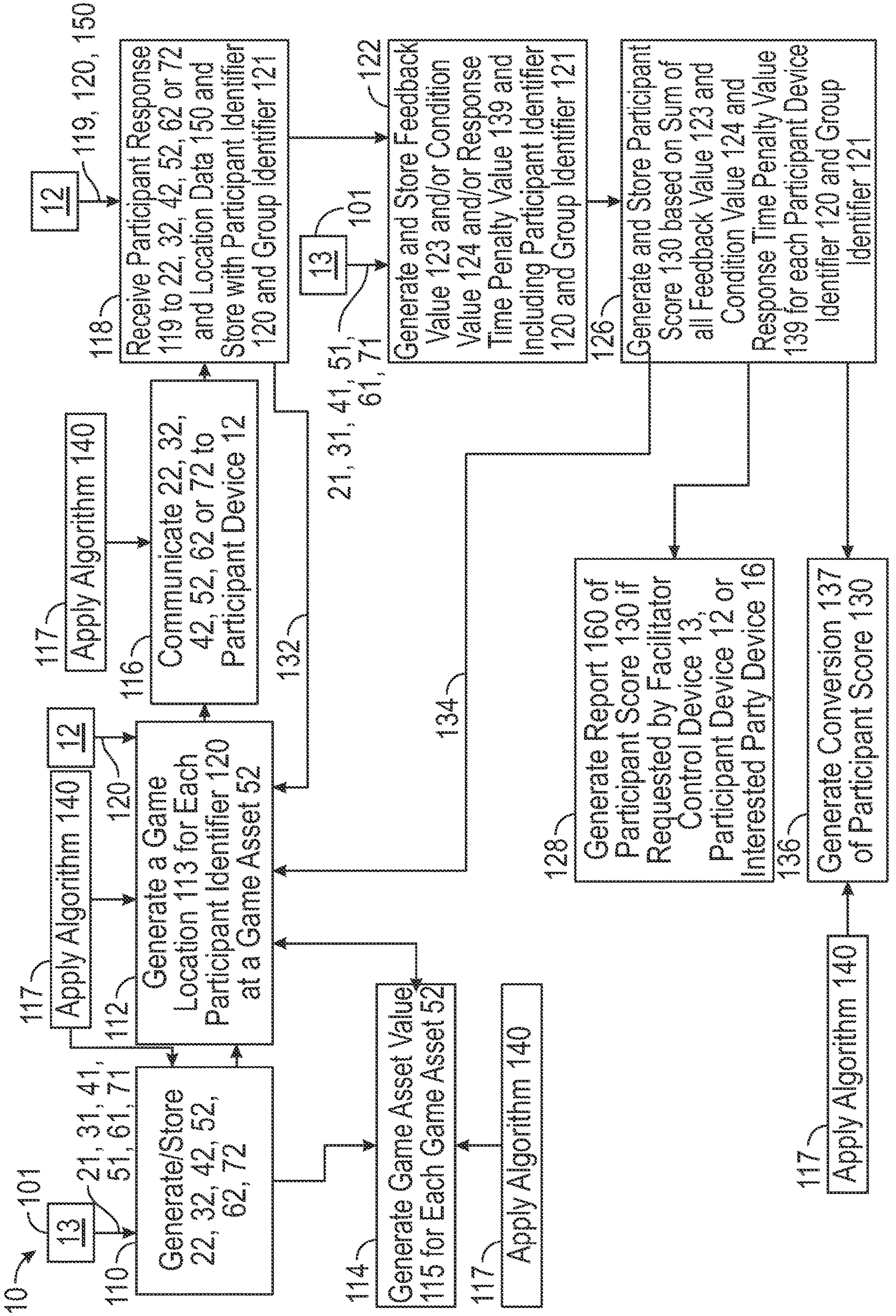
FIG. 2 is a flow chart illustrating some of the processes performed by a system according to the present invention.

FIG. 2 illustrates an embodiment of system 10 employing engagement assessment process 20, understanding assessment process 30, and wellness assessment process 40 as is facilitated by a facilitator using facilitator control device 13 and a participant using participant device 12 through database 11 as part of the facilitator's lesson plan to engage participant in a learning management system and a game incentivizing certain educational activities.

In step 101, facilitator using facilitator control device 13 may communicate to database 11 any of engagement assessment information 21, understanding assessment information 31, wellness assessment information 41, chance game element information 51, criteria-based game element information 61 and participant transaction opportunity information 71 as settings chosen by facilitator. In this way, the game to be played by participants of system 10 can be preset or customized by facilitator.

In step 110, database 11 stores and/or generates in its memory stimulus 22, prompt 32, poll 42, game asset 52, condition 62 and choice 72, each of which are types of information employed in the various processes employed herein, and as will be described in more detail herein. Preferably, stimulus 22, prompt 32, poll 42, game asset 52, condition 62 and choice 72 are based, at least in part, on engagement assessment information 21, understanding assessment information 31, wellness assessment information 41, chance game element information 51, criteria-based game element information 61 and participant transaction opportunity information 71 communicated to database 11 from facilitator control device 13, entered into or otherwise selected by facilitator using facilitator control device 13 to customize system 10. In another embodiment, such information is either all or to some extent already stored in database 11 without any input of facilitator control device 13.

Stimulus 22 is preferably related to engagement assessment information 21, the objective of which is to require a response from participant using participant device 12 over a duration and at the frequency desired by facilitator to monitor and record the participant's engagement with system 10. Stimulus 22 preferably comprises information related to the frequency and duration of content to be displayed on participant device 12 requesting a response within the duration from participant using participant device 12. Preferably, the content of stimulus 22 is not related to the lesson plan but is simply requiring some sort of response from participant unrelated to the lesson plan. In one embodiment, the content of stimulus 22 is a question, for example, "Are you still playing?" requiring a response within the duration of one minute. In another embodiment, the content of stimulus 22 is a mini-game, for example, requiring participant to press on a virtual object moving around the screen of participant device 12.

Prompt 32 is related to understanding assessment information 31, the objective of which is to test the participant's understanding of a lesson of facilitator's lesson plan by requiring a response from participant using participant device 12 to content displayed on participant device 12 related to the facilitator's lesson plan over a duration. Prompt 32 preferably comprises information related to the frequency and duration of content to be displayed on participant device 12 requesting a response to content related to the lesson plan within the duration from participant using participant device 12. Preferably, the content of prompt 32 is related to the lesson plan, requiring some sort of response to a question related to the lesson plan. In one embodiment, the content of prompt 32 is a question, quizzing participant on a substantive issue related to the lesson plan, for example, a multiple-choice question.

Poll 42 is related to wellness assessment information 41, the objective of which is to obtain and store information regarding the participant's wellness at a given time, wellness preferably being the participant's emotional and social state, by requesting a response from participant using participant device 12 to content displayed on participant device 12. Poll 42 preferably comprises information related to the time and duration of content to be displayed on participant device 12 requesting the participant's response within the duration. Preferably, the content of poll 42 is related to the participant's wellness, including social, emotional, medical, and/or health status, physical or mental. In one embodiment, the content of poll 42 is a question asking how participant is feeling today with a plurality of optional responses that are a range of emotional states.

Game asset 52 is related to chance game element information 51, the objective of which is to generate and store a game asset 52 that can be associated with a game location 113 and game asset value 115 to provide a virtual location for participant within a game operated by system 10. Preferably, there will be a plurality of game assets 52 stored in database 11, or at least one game asset 52 for each participant device 12 engaging in system 10. Preferably, game asset 52 represents a type of real estate, financial or physical or intangible asset, including but not limited to a house, apartment complex, commercial real estate, public utility, stock in a company, company, cryptocurrency, currency, commodity, intellectual property, etc.

Condition 62 is related to criteria-based game element information 61, the objective of which is to provide facilitator a tool to incentivize participants to act as the facilitator may desire based on the satisfaction of a condition set by facilitator using facilitator control device 13. Condition 62 preferably comprises information related to a condition that is either satisfiable by participant or not. In one embodiment, condition 62 comprises the time a class is starting, such that if participant device does not check in to system 10 before that time or within a certain amount of time after that time, the condition of timeless is not satisfied (or condition of tardiness is satisfied) and a penalty can be imposed within the game of system 10 as described further herein.

Choice 72 is related to participant transaction opportunity information 71, the objective of which is to provide a participant using participant device 12 an opportunity to make a decision within the game of system 10 related to a game asset 52. Choice 72 preferably comprises information related to the time and duration of content to be displayed on participant device 12 providing participant using participant device 12 a duration of time in which to make a transaction related to a game asset 52. In one embodiment, such content comprises information related to the opportunity for participant to sell or purchase a game asset 52.

The content of any of stimulus 22, prompt 32, poll 42, game asset 52, condition 62 and choice 72, preferably includes at least one of text, visual images, audio, and instructions for the participant device to vibrate or make a sound, and can be any combination thereof.

In step 112, database 11 generates and/or receives participant identifier 120 from and/or for each participant device 12, and generates game location 113 at a game asset 52 for each participant identifier 120. Game location 113 is preferably based on chance game element information 50. For example, in one embodiment, game location 113 is based on chance game element information 50 comprising pre-set conditions of facilitator (as entered by facilitator using facilitator control device 13) if the facilitator wishes to set assignments of game assets 52 or to at least certain conditions for database 11 to each generate game location 113. In another embodiment, in step 117, database 11 employs algorithm 140 stored in database 11 for generating game location 113. Algorithm 140 is preferably a randomizing algorithm. In some embodiments, algorithm 140 comprises instructions regarding certain types of game assets 52. In some embodiments, algorithm 140 comprises instructions to accommodate various fairness factors for determining game location 113 of a participant, including but not limited to algorithms giving weight to factors related to the racial, ethnic, socio-economic, wellness, health, medical, disability, geographic location of the participant using participant device 12. In some embodiments, algorithm 140 comprises instructions regarding the content, duration and/or timing of stimulus 22, prompt 32, poll 42, game asset 52, condition 62 and choice 72.

In step 114, database 11 generates game asset value 115 for each game asset 52. Game asset value 115 preferably comprises information related to the sale/purchase value of the game asset and the rent/cost to any participant whose game location 113 is at that particular game asset 52. In some embodiments, game asset value 115 comprises more complex financial values, including but not limited to inflation, deflation, interest rates, yields, appreciation, depreciation, rates of growth, etc. In some embodiments, algorithm 140 is applied to game asset value 115.

After a game location 113 is generated for each participant identifier 120 at a game asset 52, database 11, in step 116, communicates stimulus 22, prompt 32, poll 42, game asset 52, condition 62 and/or choice 72 to participant device 12, which receives and displays at least a portion of the same to the participant. The participant may then enter a response to the same into participant device 12 (any response to any of stimulus 22, prompt 32, poll 42, game asset 52, condition 62 and/or choice 72 being referred to herein as "participant response" 119), which participant device 12 then communicates the participant response to database 11.

In step 118, database 11 receives participant response 119 and stores the same in the database along with the participant identifier 120, group identifier 121 and/or location data 150. Participant identifier 120 is information related to and unique to a given participant device 12. It is preferably generated by database 11 in relation to an account unique to a participant so that participant may participate in system 10 from any number of devices by simply logging in to a software application on any participant device 12. In another embodiment, participant identifier 120 comprises information unique to participant device 12 itself, including but not limited to phone number, SIM card, International Mobile Subscriber Identity Number, ISP address, etc. In the same way, a facilitator control device identifier 125 is generated but related to facilitator control device 13.

Referring to step 132, in some embodiments, game location 113 is based on participant response 119. For example, a positive participant response 119 to a choice 72 that offered the purchase of game asset 52 changes that participant's game location 113. In another embodiment, chance game element information 50 imposes a change in game location, for example, chance game element information 50 being defined as a natural event (e.g., hurricane, fire etc.) that alters any game asset 52 or game location 113.

Since once of the objectives of system 10 is to provide a learning management system that can be used in the classroom or controlled limited teaching environments, system 10 preferably comprises group identifier 121 to identify groups of participants and facilitators that are part of the same "classroom". Preferably, database 11 generates group identifier 121 related to both facilitator control device 13 and participant device 12 and generates and/or stores all information described herein, including stimulus 22, prompt 32, poll 42, game asset 52, condition 62 and/or choice 72, with a group identifier 121.

System 10 preferably tracks, monitors and/or records the physical presence or attendance of a participant in a classroom event. To accomplish this, location data 150 generated by participant device 12 and communicated to and stored in database 11 preferably comprises information regarding the physical location of participant device 12. In one embodiment, location data 150 comprises a scan identifier related to a scannable code associated with a physical location, for example a classroom door or wall, as may be scanned by a participant using participant device 12, which generates a scan identifier unique to that location for location data 150. In another embodiment, location data 150 comprises global position system data ("GPS") generated by participant device 12 and related to the geolocation of participant device 12 is automatically, or on request, communicated to, received by, and stored in database 11. Database 11 would then preferably compare such GPS location data 150 with classroom geolocation information 151 submitted by facilitator control device 13 defining the geolocation of the "classroom" to determine whether participant device 12 is within a certain distance or geofence of such classroom geolocation information 151. In another embodiment, facilitator, using facilitator control device 13, simply takes roll of participants within his or her classroom and inputs location data 150 comprising roll call information 152 into facilitator control device 13, which is communicated to database 11 and stored therein.

In step 122, database 11 generates and stores feedback value 123 and/or condition value 124 based on participant response 119 and including participant identifier 120 and group identifier 121. Feedback value 123 preferably comprises a positive or negative value. Feedback value 123 is also preferably based on any of engagement assessment information 21, understanding assessment information 31, wellness assessment information 41, chance game element information 51, criteria-based game element information 61 and participant transaction opportunity information 71 communicated to database 11 from facilitator control device 13. In one embodiment, facilitator inputs into facilitator control device 13 understanding assessment information 31 comprising a value for a particular participant response to prompt 32, which value database 11 then incorporates into feedback value 123 for the participant response 119 to the prompt 32 related to that understanding assessment information 31. For example, in one embodiment, feedback value 123 for a correct participant response 119 to prompt 32 is a positive ten points as defined by understanding assessment information 31 set by facilitator using facilitator device in step 101. If that positive ten points is the only value associated with that participant response 119 or prompt 32, then feedback value 123 is simply generated to be a positive ten points.

In step 122, database 11 also generates condition value 124. Since there is not necessarily a participant response 119 to a condition 62, database 11 in some embodiments also generates condition value 124 in addition to or independent of feedback value 123 in step 122. In some embodiments, condition value 124 is based on criteria-based game element information 61.

In step 122, database 11 also generates time penalty value 129. Time penalty value 129 is preferably generated based on criteria-based game element information 61 defining a value for a late participant response 119. In one embodiment, facilitator inputs into facilitator control device criteria-based game element information 61 defining a negative value, for example negative five points. Preferably, database 11 generates time penalty value 129 to be a negative value if the response time for a participant response 119 is later than the duration of the stimulus 22, prompt 32, poll 42, game asset 52, condition 62 and/or choice 72, which duration may have been defined in engagement assessment information 21, understanding assessment information 31, wellness assessment information 41, chance game element information 51, criteria-based game element information 61 and participant transaction opportunity information 71.

In step 126, database 11 generates and stores participant score 130 based on the sum of all feedback value 123, condition value 124 and response time penalty value 139, for each participant identifier 120 and group identifier 121. In one embodiment, such is generated based on the sum of all feedback value 123, condition value 124 and response time penalty value 139 over a certain time period, including but not limited to a time period associated with group identifier 121, a time period set by facilitator using facilitator control device 13, or a time period as defined by any of engagement assessment information 21, understanding assessment information 31, wellness assessment information 41, chance game element information 51, criteria-based game element information 61 and participant transaction opportunity information 71 communicated to database 11.

Referring to step 134, in some embodiments, participant score 130 is used to generate game location 113. For example, in one embodiment, a participant can use participant score 130 to purchase game location 113 or game asset 52. In another embodiment, a certain pre-defined participant score 130 automatically entitles a participant to game location 113 or game asset 52.

One of the objectives of system 10 is to provide a reporting of learning objectives of a level of detail not provided in currently available learning management systems. Embodiments of the present invention are directed at producing reports mapping a participant's wellness over time relative to their engagement and understanding of lesson plans or relative to other activities they engage in within system 10. In step 128, database 11 generates report 160 comprising participant score 130. Report 160 is preferably generated upon instruction from facilitator control device 13, participant device 12 and/or interested party device 16 and accessible thereto in any form typical for reporting information. In one embodiment, report 160 comprises participant score 130, feedback value 123, condition value 124, response time penalty value 139 shown relative to each participant response 119 (or information summarizing participant responses 119), including each participant response 119 to poll 42 in order to chart the participant's wellness relative to their engagement and understanding. Various other examples of report 160 are described in other examples of system 10 described herein.

One of the objectives of system 10 is to provide a learning management system that enables participants to exchange the value of their efforts within the system 10 to obtain real-world benefits. In step 136, database 11 generates conversion 137. In one embodiment, conversion 137 is based on algorithm 140 as may be applied to it by database 11. In another embodiment, conversion 137 is based on a ratio of participant score 130 to a real-world currency, value of a physical object or reward. Conversion 137 may be based on input from facilitator control device 13, interested party device 16 or participant device 12. For example, in one embodiment, facilitator control device 13 communicates to database 11 a ratio of participant score 130 to a certain physical reward such as extra recess, candy, toys, etc. Various other examples of conversion 137 are described in other examples of system 10 described herein.

Figure 3:
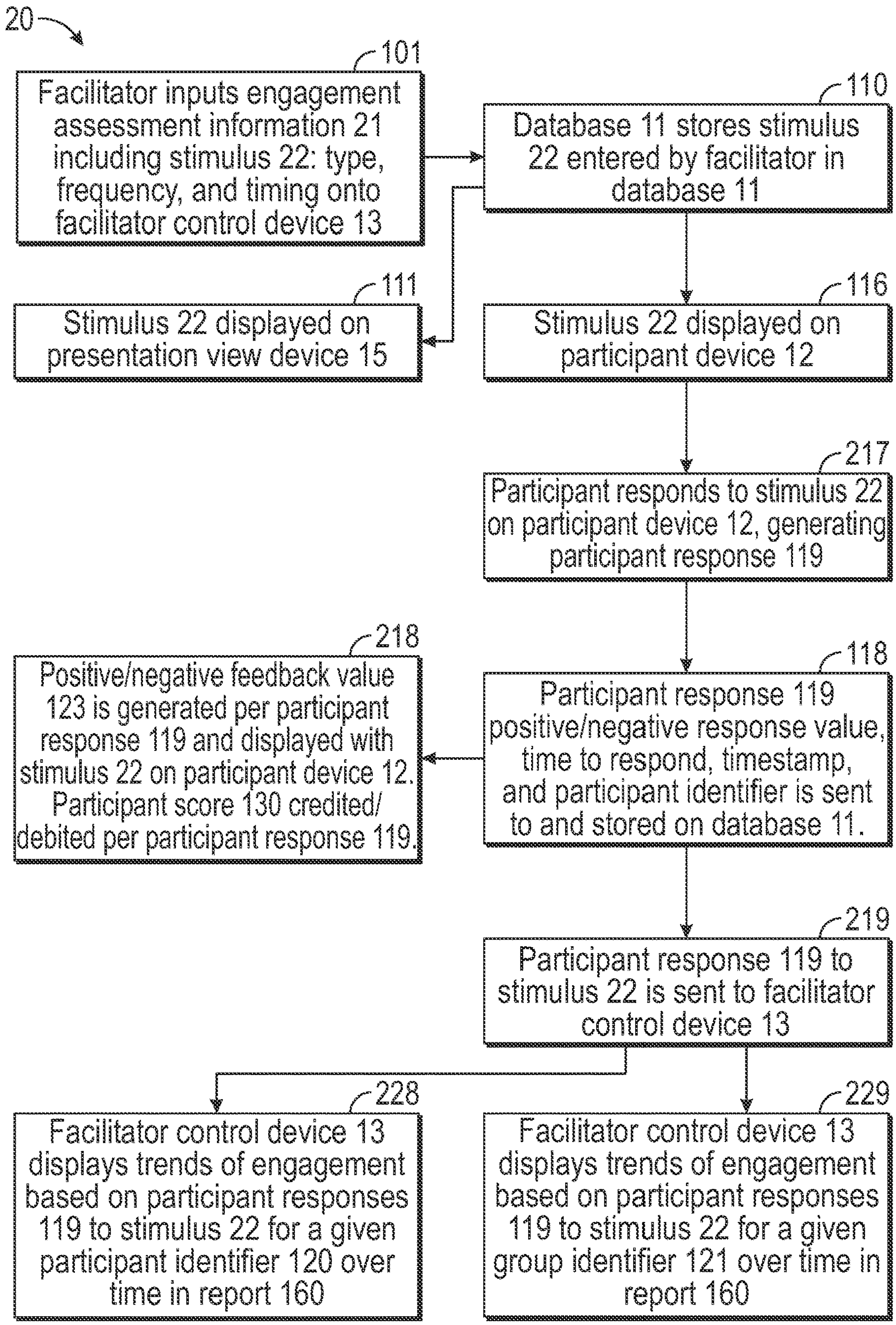
FIG. 3 is a flow chart illustrating an example of the engagement assessment process performed by a system according to the present invention.

FIG. 3 illustrates engagement assessment process 20 according to an embodiment of the present invention, with reference to some of the same steps as the processes illustrated in FIG. 2 and describing additional processes. The embodiment illustrated in FIG. 3 is an example of a process employed by system 10 when a facilitator wishes to use presentation view device 15. In step 101, the facilitator inputs engagement assessment information 21 including various information for a stimulus 22, including type, frequency, timing and content of such stimulus 22. Database 11 stores such information and, in step 116, communicates it to participant device 12 for display. It may also communicate it to presentation view device 15 for display there, where it can be viewed by a plurality of participants on the same screen. After stimulus 22 is displayed in steps 116 and 111, in step 217 participant responds to stimulus 22 by entering participant response 119. Following step 217, in step 118 participant device 12 sends participant response 119 to database 11, which stores it. In step 218, database 11 generates feedback value 123 for that particular participant response 119 and displays it on participant device 12. Database 11 also credits or debits participant score 130 with feedback value 123. In step 219, participant response 119 is sent to facilitator control device 13 for display there.

One of the objectives of the present invention is to measure participant engagement and to report it in a way that is useful for evaluating both the participant and the facilitator. In step 228, database 11 generates report 160 comprising participant responses 119 to stimulus 22 over a selected amount of time for a given participant identifier 120, which report is displayed to facilitator control device 13. This report 160 enables facilitator to evaluate the engagement of an individual participant by providing information related to participant responses 119 to stimulus 22 for a given participant identifier 120 over time. In step 229, database 11 generates report 160 comprising participant responses 119 to stimulus 22 over a selected amount of time for all participant identifiers 120 associated with a group identifier 121, which is displayed to facilitator control device 13. This report 160 enables facilitator to evaluate the engagement of all participants within a class by providing information related to participant responses 119 to stimulus 22 with the same group identifier 121 but different participant identifiers 120.

In the ways described above, system 10 measures the level of a participant's engagement throughout a class. Among other things, system 10 measures the speed and accuracy of participant responses 119. System 10 generates reports 160 on a per class, week, month, semester, school year, custom or other time frame. System 10 can produce reports 160 for individual students, custom groups, classes, by demographic, by other characteristic, by teacher, by school, by grade level, by district, by region, by country, or other group.

Figure 4:
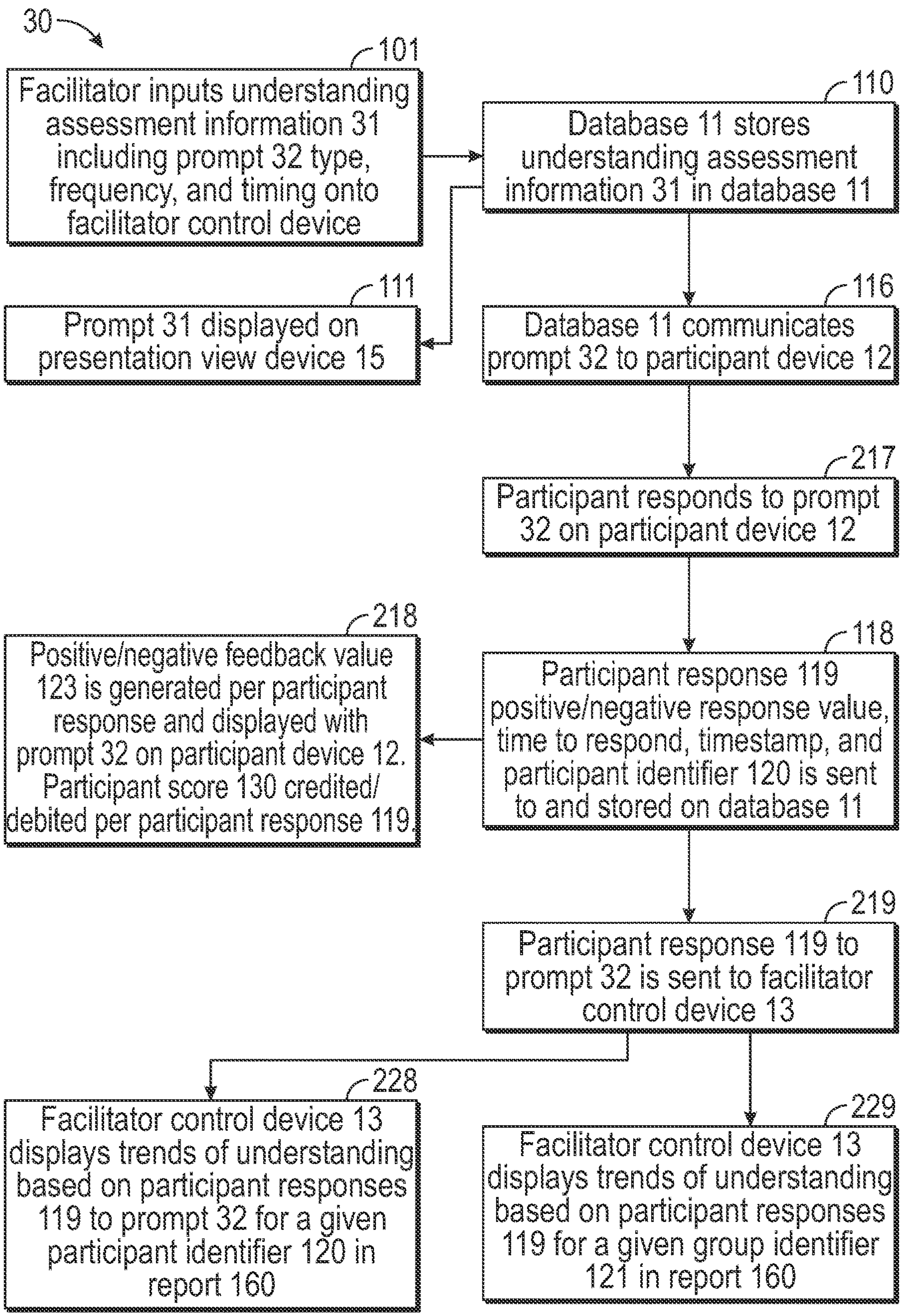
FIG. 4 is a flow chart illustrating an example of an understanding assessment process performed by a system according to the present invention.

FIG. 4 illustrates understanding assessment process 30 according to an embodiment of the present invention, with reference to some of the same steps as the processes illustrated in FIG. 2 and describing additional processes. The embodiment illustrated in FIG. 4 is an example of a process employed by system 10 when a facilitator wishes to use presentation view device 15. In step 101, the facilitator inputs understand assessment information 31 including various information for prompt 32, including type, frequency, timing, and content of such prompt 32. Database 11 stores such information and, in step 116, communicates it to participant device 12 for display. It may also communicate it to presentation view device 15 for display there, where it can be viewed by a plurality of participants on the same screen. After prompt 32 is displayed in steps 116 and 111, in step 217 participant responds to prompt 32 by entering participant response 119. Following step 217, in step 118 participant device 12 sends participant response 119 to database 11, which stores it. In step 218, database 11 generates feedback value 123 for that particular participant response 119 to that particular prompt 32 and displays it on participant device 12. Database 11 also credits or debits participant score 130 with feedback value 123. In step 219, participant response 119 is sent to facilitator control device 13 for display there.

In step 228 of FIG. 3, database 11 generates report 160 comprising participant responses 119 to prompt 32 over a selected amount of time for a given participant identifier 120, which report is displayed to facilitator control device 13. This report 160 enables facilitator to evaluate the understanding of an individual participant by providing information related to participant responses 119 to prompt 32 for a given participant identifier 120 overtime. In step 229, database 11 generates report 160 comprising participant responses 119 to prompt 32 over a selected amount of time for all participant identifiers 120 associated with a group identifier 121, which is displayed to facilitator control device 13. This report 160 enables facilitator to evaluate the understanding of all participants within a class by providing information related to participant responses 119 to prompt 32 with the same group identifier 121 but different participant identifiers 120.

In the above-described ways, system 10 provides facilitators with tools to measure and encourage growth and retention of content within lesson plans. In one embodiment, a first prompt 32 is communicated to participant device 12 at a first time, and a second prompt 32 related to first prompt 32 is communicated to participant device 12 at a second time after the first time.

In another embodiment, facilitator can input into facilitator control device 13 scores from other evaluations of the participant's understanding that are not performed within system 10, including homework, assignments, papers, research projects, presentations etc., which scores are preferably entered into system 10 as understanding assessment information 31 and stored in database 11. Since such understanding assessment information 31 would not require or request participant response 119, in one embodiment, database 11 generates participant score 130 based on such understanding assessment information 31 alone independent of participant response 119.

Figure 5:
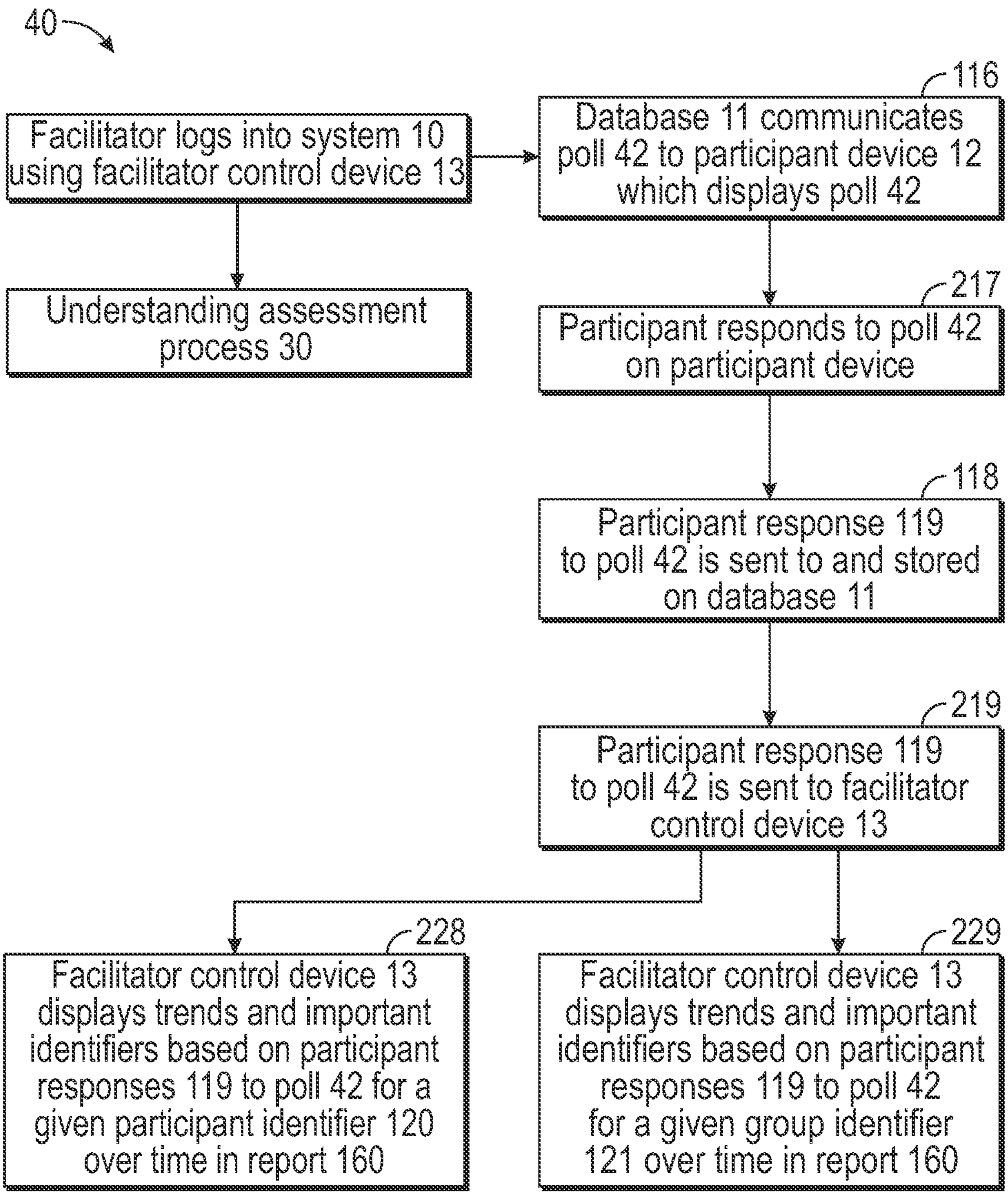
FIG. 5 is a flow chart illustrating an example of a wellness assessment process performed by a system according to the present invention.

One of the objectives of the present invention is to measure, monitor and evaluate the wellness of participants within system 10, which information enables facilitators, participants and interested parties to evaluate how the participant's life in general affects their understanding and engagement with system 10. FIG. 5 illustrates wellness assessment process 40 according to an embodiment of the present invention, with reference to some of the same steps as the processes illustrated in FIG. 2 and describing additional processes. Referring to FIG. 5, in step 116, database 11 communicates poll 42 to participant device 12 and/or poll 42 is displayed on presentation view device 15. Preferably, the content of poll 42 is related to the wellness of participant. For example, in one embodiment, the content of poll 42 comprises text asking whether the participant had breakfast or how much sleep they were able to get the night before. In step 217, participant responds to poll 42 by inputting the participant response 119 on participant device 12. Following step 217, in step 118, participant device 12 sends participant response 119 to database 11, which stores it. In step 218, database 11 generates feedback value 123 for that particular participant response 119 to that particular poll 42 and displays it on participant device 12. In step 219, participant response 119 is sent to facilitator control device 13 for display there.

In step 228 of FIG. 5, database 11 generates report 160 comprising participant responses 119 to poll 42 over a selected amount of time for a given participant identifier 120, which report is displayed to facilitator control device 13. This report 160 enables facilitator to evaluate the wellness of an individual participant by providing information related to participant responses 119 to poll 42 for a given participant identifier 120 overtime. In step 229, database 11 generates report 160 comprising participant responses 119 to poll 42 over a selected amount of time for all participant identifiers 120 associated with a group identifier 121, which is displayed to facilitator control device 13. This report 160 enables facilitator to evaluate the wellness of all participants within a class by providing information related to participant responses 119 to poll 42 with the same group identifier 121 but different participant identifiers 120.

System 10 preferably comprises a behavior tracking tool allowing facilitator to record a participant's positive and negative behaviors and store in database 11. In one embodiment, behavioral events are preferably entered into system 10 as wellness assessment information 41 and stored in database 11. Since such wellness assessment information 41 would not require or request participant response 119, in one embodiment, database 11 generates participant score 130 based on such wellness assessment information 41 alone, independent of participant response 119.

Any report 160 can be generated by database 11 on a per class, week, month, semester, school year, custom or other time frame. Database 11 can produce reports for individual students, custom groups, classes, by demographic, by other characteristic, by teacher, by school, by grade level, by district, by region, by country, or other group.

System 10 preferably comprises a participant reflection and feedback loop. Reports 160 can be used for participants to see their results and reflect on areas of improvement and areas of excellence. System 10 preferably also allows participants to send feedback to teachers about the quality of the lesson, ideas for improvement, helpful aspects, and other questions.

Algorithm 140 preferably comprises "relativity" algorithms that allow various groups, participants, facilitators and interested parties to be compared. The relativity algorithm 140 factors social/emotional status, socioeconomic status, student profiles/mix, special education status, and other variables.

System 10 preferably comprises a recruiting tool that interested parties, such as a company, can use to identify and communicate with participants who are employee candidates. System 10 preferably generates and stores participant profiles in database 11 including all the information described herein associated with participant identifier 120. In another embodiment, interested parties view lists of anonymous participants ranked by participant score 130 or some variation of it as generated in light of algorithm 140. In one embodiment, database 11 generates participant score based on algorithm 140 which standardizes a plurality of participant scores for different participant identifiers 120 to account for subjectivity and variation that may affect scores due to differences in facilitator, group, geolocation, etc. Interested parties can choose a participant profile or group of profiles to communicate with about employment opportunities. System 10 then preferably communicates a message to participant device 12 and the participant will have the opportunity to accept the interested party's message or decline it. In another embodiment, the participant can choose not to be displayed on the list. In another embodiment, participants can personalize their profiles to include other noteworthy information.

System 10 preferably comprises an interface for interested parties, stored in database 11. In one embodiment, interested parties can sponsor facilitators, participants, groups, classes, teachers, classrooms, schools or districts. In one embodiment, interested parties gain standing in the game, have brand/logo placement on any of the content of information described herein, opportunities to provide coupons, discounts and giveaways to students, parents and teachers, and access to recruiting tools.

System 10 preferably comprises a facilitator wish list tool. In one embodiment, facilitators enter into database 11 lists of classroom needs and wants such as notebooks, calculators, laptops, etc. Interested parties can choose to purchase those items for the facilitator for recognition and standing in the game as described above.

System 10 preferably provides default values for student income, expenses, rewards and other values in the game, which values are stored in database 11 and performed either as algorithm 140 or stored and employed when any information is generated, as for example described in step 110 when stimulus 22, prompt 32, poll 42, game asset 52, condition 62 and/or choice 72 are generated.

System 10 preferably displays any of the information, values, options, settings, variables described herein to facilitator in visually attractive ways, for example, as levers, knobs, or buttons for the facilitator to adjust. For example, chance game element information 51 addressing the availability of virtual currency is displayed on facilitator control device 13 as a lever adjusting the value of game assets 52 related to that chance game element information 51.

EXAMPLES

The invention is further illustrated by the following non-limiting examples that further elaborate on the various features described above.

Example 1

The following Table 1 describes an embodiment of system 10 of the present invention in terms of the steps taken by the facilitator and participant at various stages of use of system 10.

TABLE 1

| Facilitator | Participant |
|---|---|
| Before Interaction Begins | |
| Plot Stimuli, Prompts, "Rounds", "Levels", Checkpoints throughout activity<br>Set Gameboard Arrangement (randomized or adjustable participant seating/location chart) | Arrive to interaction and get prepared<br>Earn a randomly chosen reward for being on time/early & prepared |
| When Interaction Begins | |
| Open Software/Website of system 10 on presenting device<br>Choose platform to deliver content.<br>Select start experience (mode)<br>Game board overlay displays with randomized locations for participants, team & participant leaderboards, standings<br>Game board overlay displays a chance-based element at the beginning of the class that could have positive, negative or neutral implications for the group<br>If the whole group/team arrives on time, then the gameboard displays a bonus message for the group/team(s). | Check app on participant device or the main display to find their randomized gameboard location<br>Scan QR code (or bar or other sort of code) with system accompanying app on personal device to confirm presence and record arrival time<br>View daily information for the interaction including, but not limited to, objective, announcements, agenda<br>View personal & team standings, personal balance, growth, performance data with daily goals<br>Take short questionnaire to check for prior knowledge/retention, social emotional status, daily agreements & affirmations<br>Participants can use their accumulated points or currency to acquire privileges, prizes, interaction assets, investments or other desired outcomes during transaction periods designated by the facilitator<br>Depending on gameboard location, students may have some opportunity, reward, task, penalty, fee, bonus or other element of chance<br>Depending on gameboard location, participants may have an opportunity to acquire the location asset with points or currency if it is not "owned" by another participant or may owe the current owner points or currency<br>If participant is late, they get earn a penalty and forfeit virtual currency or points |
| During Interaction | |
| Select start interaction<br>Gameboard is minimized and platform becomes active and visible, while system tools, menus, options and information scroll remain visible.<br>Execute Interaction Plans<br>Deliver Prompts with system accompanying app on personal device (or this can be initiated and done by system 10 on the display)<br>Initiate Stimuli with accompanying app on personal device (and/or this can be done randomly by system 10)<br>Note: Stimuli includes, but is not limited to, A) visual cues on the main display or B) audible | Participate & engage in lesson<br>Respond to Stimuli with personal device<br>Answer Prompts with personal device<br>Participants accumulate points or virtual currency with correct answers & timely responses<br>Participants earn a weekly (or other designated time interval) payment of points or currency for meeting participation expectations set by facilitator<br>Participants earn points or virtual currency based on assignment or assessment performance<br>Participants earn points or currency for completing tasks beyond the expectations of normal participation |

TABLE 1-continued

| Facilitator | Participant |
|---|---|
| cues from the facilitator's device or C) vibration, visual or audible cues from each participant's device<br>Record negative behaviors (by voice, one-touch, or other input)<br>Record noteworthy positive behaviors (by voice, one-touch, or other input) | Participants can earn increases in payment amounts and scales by meeting criteria chosen by the facilitator<br>Participants can earn decreases in payment amounts and scales by failing to meet minimum criteria chosen by the facilitator |
| At the End of Interaction | |
| Select End Interaction<br>Gameboard overlay displays group and team progress, top participant performances (based on various individual measures or a composite of multiple measures), and other highlights.<br>Confirm or adjust results<br>Dismiss Participants | Based on class performance, elements of chance and other experience factors, participants may have rewards, bonuses, fees, penalties, opportunities or other consequences to address<br>Participants answer a few questions to reflect and/or confirm understanding of content delivered during the interaction |
| After the Interaction | |
| Receive/Review automatically generated digital reports for the interaction and individual student reports<br>System 10 alerts facilitator of areas of concern<br>Send chosen reports to participants and/or interested parties and/or organization via email or shared drives or other means | System 10 produces an overview of participant's performance, behavior, engagement, understanding and retention from the interaction and the new accumulated totals and measures from previous interactions. |

The following Table 2 describes an embodiment of system 10 of the present invention in terms of the steps taken by certain devices within system 10 itself.

TABLE 2

| System 10 |
|---|
| Before Interaction Begins |
| Receives input from facilitator<br>Sets and/or randomizes prompts throughout interaction based on algorithms plus facilitator inputs & preset preferences of system 10<br>Sets and/or randomizes stimuli throughout interaction based on invention algorithms plus facilitator inputs & preset preferences of system 10<br>Sets checkpoints throughout each lesson<br>Generates participant location based on algorithms plus facilitator inputs & preset preferences of system 10<br>Generates chance-based elements based on algorithms plus facilitator inputs & preset preferences of system 10<br>Generates group, individual leaderboards<br>Main Display: Displays current facilitator location, leaderboard(s), start button, welcome message, interaction objectives, reminders, announcements, countdown to interaction, alerts, live attendance<br>Facilitator Display: Countdown to interaction, options to start class, apply the gains/losses to facilitator points or currency based on gameboard location, interaction layout, gameboard view option, facilitator view option<br>Participant Display: Countdown to interaction, current points or currency balance, gameboard location, notifications, alerts, announcements, reminders, interaction objectives, option to begin questionnaire, option to enter or scan their location code, option to shop for prizes, option to purchase location |
| When Interaction Begins |
| Timer starts at 0:00 and records relative timestamps at each facilitator and participant input.<br>Alert sound, visual, vibration or other que is delivered to main display, facilitator device and/or participant device, based on preset preferences<br>Main Display: Gameboard overlay reveals chance-based element and countdown to complete questionnaires, countdown for transaction time<br>Facilitator Display: Interaction layout with upcoming stimuli, prompts, checkpoints, interaction timer, facilitator view option, gameboard view option<br>Participant Display: [locked/seized] Initial questionnaire, countdown to make transactions and complete questionnaire, beginning points or currency balance, daily agreement or affirmation |

TABLE 2-continued

| System 10 |
|---|
| If participant is late: Continual notifications, alerts including but not limited to sounds, vibrations, visuals will appear, fine amount is displayed and applied to their balance when they arrive or at the end of class<br>Facilitator can reverse, override any transactions and/or create or approve custom transactions |
| During Interaction |
| Timer runs<br>Main Display: Facilitator Platform is displayed with menu icon overlay and scrolling information bar, facilitator question, response feed, these are customizable by the facilitator; Stimuli and prompts will appear at random times and/or by teacher designation or initiation<br>Menu includes but not limited to leaderboard, random volunteer generator, chance elements, gameboard, timer, checkpoints, interaction status, etc.<br>Record, Track participant and facilitator inputs, timeouts, response to stimuli, response to prompts, participant positive/negative behaviors, point or currency transactions<br>Facilitator Display: Interaction layout, round number or title, round countdown timer with urgency coloring or alerts, next round title, interaction timer with urgency coloring or alerts, stimuli generator option, prompt display option, element of chance option, participant view option, gameboard option, menu, these will all be customizable to appear in display or in menu or not at all<br>Participant Display: Status bar with checkpoints, overall balance, interaction tallies of gains/losses, understanding level, improvement, behavior, engagement; Option to communicate with facilitator or post to main display; alerts for prompts, stimuli, multiple choices or response fields; notifications (sounds, visual, vibrations, etc.) for positive or negative outcomes |
| At the End of Interaction |
| Notification or alert at remaining time mark selected by facilitator<br>Main Display: [on facilitator input] Interaction totals, highlights, leaderboard(s), asset acquisitions, element of chance, closing messages, reminders, assigned work, final assessment of understanding<br>Facilitator Display: Interaction breakdown, option to make adjustments to interaction events or add events/transactions/observations, option to add notes and reflections, option to close interaction, option to view next interaction<br>Participant Display: Individual and group results, overall participant outcome, final assessment of understanding, reflection questionnaire |

TABLE 2-continued

| System 10 |
| --- |
| After the Interaction |
| Unlock, unseize participant phones |
| Generate interaction reports |
| Send automatic reports to interested parties and participants |
| Restrict transactions for participants who failed to meet minimum requirements of behavior, engagement, performance, etc. during the interaction |
| Participants in good standing can acquire assets, prizes, virtual investments or other items in exchange for points or currency. |
| Participants can check standing, communicate with facilitator and other participants |
| Interested parties can create their own point or currency system they can transfer interaction points or currency or not. |
| Interested parties can assign additional tasks for participants to earn points or currency that is either unrelated to or has a transfer rate to their interaction group. |
| Interested parties can utilize system 10 as a chore and/or allowance management tool or as a point system |
| Facilitators can adjust settings, add interactions, generate customizable reports, message participants or interested parties. |

Reports 160 preferably generated by system 10 include but are not limited to any of the following information: facilitator/interaction pacing, by completion percentage, by number of prompts, group comparisons, over time per group, and/or over time by class; number of distractions/misbehaviors by group/team/individual by severity, frequency, total quantity, average over a designated time period, and/or by point in the interaction; noteworthy positive behaviors by group/team/individual by severity, frequency, total quantity, average over a designated time period, by point in the interaction; participant attendance by group/team/individual tardiness, by severity, frequency, total quantity, total time missed, and/or average quantity or time missed over a designated time period; participant understanding by group/team/individual total accuracy, within interaction time, over time, average over time, by level of assessment, and/or by level of rigor; correlation reports; correlation coefficients; ANOVAs, One-way, Two-way, Factor Effects, Tukey-Kramer Procedures, Levene Test, Chi-Square, Regressions, Predictive and/or Probabilities; Engagement by response time, average, total, by accuracy, by response quantity, and/or by response percentage; SEL, breakfast stats, sleep stats, daily outlook, other; Retention, particular concepts over time and/or overall retention rates; composite reports including analysis of two or more factors including overlaid measures, scatter plots, line of best fit, predictive factors and/or significance of relationships; comprehensive narratives, including generation of a written paragraph form note including highlights and areas for concern for each student which can be pasted into letters to interested parties and organizations or entities for job, award, reward or other positive/negative consequence consideration.

Each report 160 is preferably generated by the following time frames: per interaction, per week, per month, per quarter (school quarter or calendar or other), per semiannual (school semester or calendar or other), per year (school year or calendar or other), other customized designated time period, and/or by day of the week.

The following Table 3 lists various additional features and/or characteristics of the devices, processes and features of system 10.

TABLE 3

| Design |
| --- |
| Components: |
| Relational Database |
| Website |
| Web Application |
| Personal Device Application (for phones, tablets and other personal devices) |
| Personal Reporting System/Process for Participants without personal devices |
| Gamification System with elements of competition, chance, cooperation, strategy, parameters, rewards, penalties and other aspects |
| Financial Literacy Immersion Program |
| Multifaceted Participant Payment System |
| Multifaceted Participant Payment/Cost System |
| Game difficulty level adjustment tool for facilitators (economic levers) |
| Time in/Time off feature |
| Geofencing Student Monitoring/Attendance Component |
| Intragroup Fairness & Equity Algorithm |
| Coupon & Discount Generator for Differentiation, Fairness, Equity |
| Intergroup Points or Currency Exchange Rate Calculator Algorithm |
| Intergroup Balancing Algorithm for Comparisons Between/Among Groups |
| Randomized Location Generator for Participants |
| Randomized Chance Element Generator |
| Participant Engagement Measuring Process (including systems & tools to carry out process) |
| Participant Behavior Tracking Process (including systems & tools to carry out process) |
| Participant Performance Tracking Process (including systems & tools to carry out process) |
| Participant Understanding Measuring Process (including systems & tools to carry out process) |
| Participant Knowledge Retention Measuring Process (including systems & tools to carry out process) |
| Participant Attendance Measuring Process (including systems & tools to carry out process) |
| Participant Health, Social & Emotional Wellness Measuring Process (including systems & tools to carry out process) |
| Participant Reflection & Growth Promotion Process |
| Participant Profile Account Package (includes history and measures of points/currency, performance, behavior, engagement, effort, attendance, understanding, retention, and other factors) |
| Group Profile Package (includes history and measures of points/currency, performance, behavior, engagement, effort, attendance, understanding, retention, and other factors) |
| Participant Narrative Generator |
| Incentive System with Participant Input |
| Facilitator Activity Creation & Sharing System |
| Automatic Interested Party Communication Process |
| Business Sponsorship Connection Tool |
| Sponsor Bidding System |
| Automatic Grading Program |
| Automatic Grade Transfer System (from physical, excel, online or other gradebook formats) |
| Personal Device Control System |
| Personal Device Monitoring System |
| Participant Onboarding Profile |
| Metadata Collection & Analysis Program |
| Preferential/Strategic Seating Generator |
| Interaction Pacing System |
| Accessibility Components to facilitate Ease of Use for all Potential Users |
| Customizable Interaction Plan Generator |
| Customizable Experience Participant/Interested Party Contract |
| Screen Record Feature with or without Audio, Annotations, Experience Displays |
| PDF Scanning Tool |
| Assignment Turn in Portal |
| Gradebook Function |
| Student Information System |
| Customizable Preloaded Positive/Negative Behavior List with Suggested Point or Currency Values |

Example 2

A system 10 according to an embodiment of the present invention combines features of a learning management system (LMS) with an interactive gamification experience with a financial literacy focus and real-world theme for a facilitator that is a teacher and participants that are students in a class. This Example 2 embodiment measures student engagement, behavior, performance, understanding, retention, social emotional wellness, teacher effectiveness, lesson effectiveness. It analyzes those factors in relation to one another. It tracks metrics as individuals, whole class, school, district, country, region, world, etc. It generates automated reports and sends them to teachers, parents, students or other interested parties, facilitators or learners. It can be integrated into any lesson plan of any subject matter. It has a lesson plan generator. Teachers complete an adaptable form. This Example 2 embodiment produces a lesson plan and a game structure for that lesson. The form includes lesson topics, objectives, standards, essential questions, timing, check for understandings, game elements, pre/post quizzes, feedback questions, reflection questions, student choice points/options, etc. Lessons do not have to be completed in one day/class. They can be paused. Also, multiple lessons can be administered in one day/class. Throughout a lesson, learners interact with the invention through a personal device. They respond to teacher prompts, random stimuli and other game elements. The game collects students' responses and response time. At the end of a lesson, teachers will have access to a lesson report. The report will include class engagement, behavior, understanding, growth and retention statistics. The report will rank the lesson relatively against the teacher's other classes and other lessons. Teachers can also view their lesson relative to other teachers'/users' lessons throughout the network. Teachers can reflect, take notes and improve on their lessons. Teachers, students and parents can also view individual student reports from individual lessons or longer periods of time. Students have opportunities to reflect on and set goals for their behaviors, learning and engagement. They can also give feedback to teachers. Teachers and parents can give feedback to students.

This Example 2 embodiment incorporates an ongoing game in which students earn virtual dollars or points. The game involves elements of chance and serves to educate students about financial literacy. Students earn a salary for their studentship, commission based on their performance, wages for additional tasks and they can also earn money from investments in virtual stocks or classroom real estate. In addition, students can earn money by collecting rewards or bonuses from elements of chance or achievement in the game. Students incur regular expenses to simulate rent, mortgages and car payments. They can also spend on recurring class privileges (to simulate utilities and monthly services like cable, NETFLIX®, cellular, electric, gas, etc. bills) or one-time purchases. Students can invest in classroom real estate (like seats, desks, supplies, etc.), or create a virtual portfolio including savings, stocks, cryptocurrency, bonds, CDs, mutual funds, etc. The game will feature options to utilize debit cards, credit cards, checks, phone pay (called "class pay"), in-app purchases and printable currency ("class bucks"). Additionally, the game can incorporate mortgage, amortization, taxes and other financial literacy topics/skills.

Throughout the game students will be presented with elements of chance. The system of this Example 2 embodiment randomizes seating. This can either be done physically where the seat characteristics are fixed and students are placed daily or by the frequency chosen by the teacher or this can be done virtually where the students are in a fixed position (virtually or physically) and the seat characteristics are assigned at random to students daily or by the frequency chosen by the teacher. Seat characteristics may include a positive reward/bonus/prize or a negative outcome or a choice that the student is presented with that may result in a positive, negative or neutral outcome. At the beginning of class, or another frequency chosen by the teacher, the class will be presented with a random event ("reality check") that may affect an individual, group or whole class in a positive, negative or neutral way. It may also present an opportunity for the individual, group or class to make a decision that may have a positive, negative or neutral impact in the game. The invention also allows for teachers to link lessons or learning achievements to elements of the game. For example, based on a student's response to a check for understanding a question, they may have the opportunity to earn a random, fixed or choice element. Attendance, turning in assignments, peer tutoring, academic risk-taking and other positive learning behaviors are incentivized through game rewards, bonuses, prizes, awards, etc. Negative outcomes like fines, penalties, etc. will be enforced to disincentivize negative learning behaviors like absenteeism, tardiness, disengagement, distractions, delinquency, etc.

The game of this embodiment will have established rules, consequences and scales to create a fair, competitive, challenging and balanced classroom economy system, but teachers will have the ability to adjust by addition, deletion and/or changing the preset parameters.

In one embodiment, system 10 and a method can include instructor 308 presenting or otherwise displaying activity 310 (which can include for example a math learning instruction), to one or more students 312. Students 312 preferably observe activity 310 and can interact via participant device 12. Each participant device 12 preferably has installed on it, most preferably prior to the start of the activity, application 313 is configured to allow interaction and participation in activity 310. Optionally, students 312 can interact not only via participant device 12, but also via direct, in-class, participation—for example by raising their hand and/or speaking.

Figure 6:
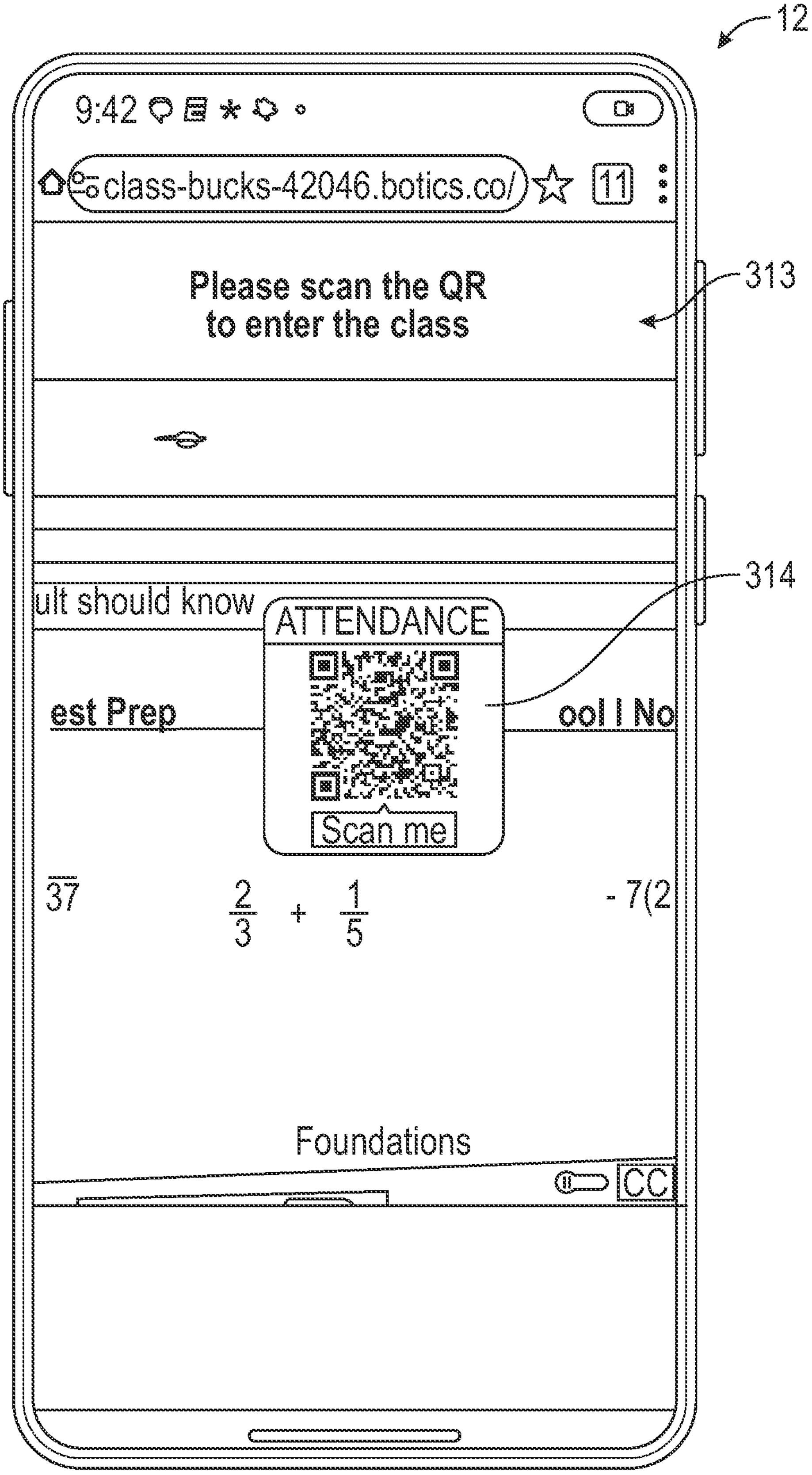
FIG. 6 is a drawing which illustrates a display of a participant device when a user is scanning attendance indicia according to the present invention.

In one embodiment, when a class or activity is about to begin or is starting or is otherwise occurring, attendance indicia 314 can be presented to the one or more students. Upon arriving or otherwise beginning the activity, the students preferably use a digital camera on the participant device 12 to capture an image or otherwise obtain data from or otherwise associated with attendance indicia 314. For example, in one embodiment, indica 314 can comprise a QR code and each student preferably uses their respective participant device 12 to capture the QR code. Application 313 is preferably configured to prompt the user to scan or otherwise cause their participant device to acquire attendance indicia 314. FIG. 6 illustrates an example of what a user would see on the user interface of participant device 12 when positioned to capture an image of attendance indicia that is presented on a smartboard. In one embodiment, attendance indicia 314 can comprise a quick-response code ("QR code"), a barcode, a string of text, numbers and/or a combination thereof.

To avoid the possibility of a student who is present and actually in attendance from snapping a photo of the attendance indicia 314 (for example using a photograph feature of their messaging app (i.e. outside of application 313) and thus sharing attendance indicia 314 with a student who is remote and not actually present, in one embodiment, the attendance indicia 314 can be displayed on a smart board or other electronic display and the attendance indicia 314 can be caused to change and/or otherwise update periodically—for example every couple of seconds such that by the time any non-present student did receive such photo, attendance indicia 314 will have already updated. Because participant devices 12 are preferably communicably coupled to the Internet or other network on which application 313 communicates, as the attendance indicia updates, the application can likewise be updated in real time such that the participant device is synchronized to only accept the then currently-displayed attendance indicia 314.

Figure 11:
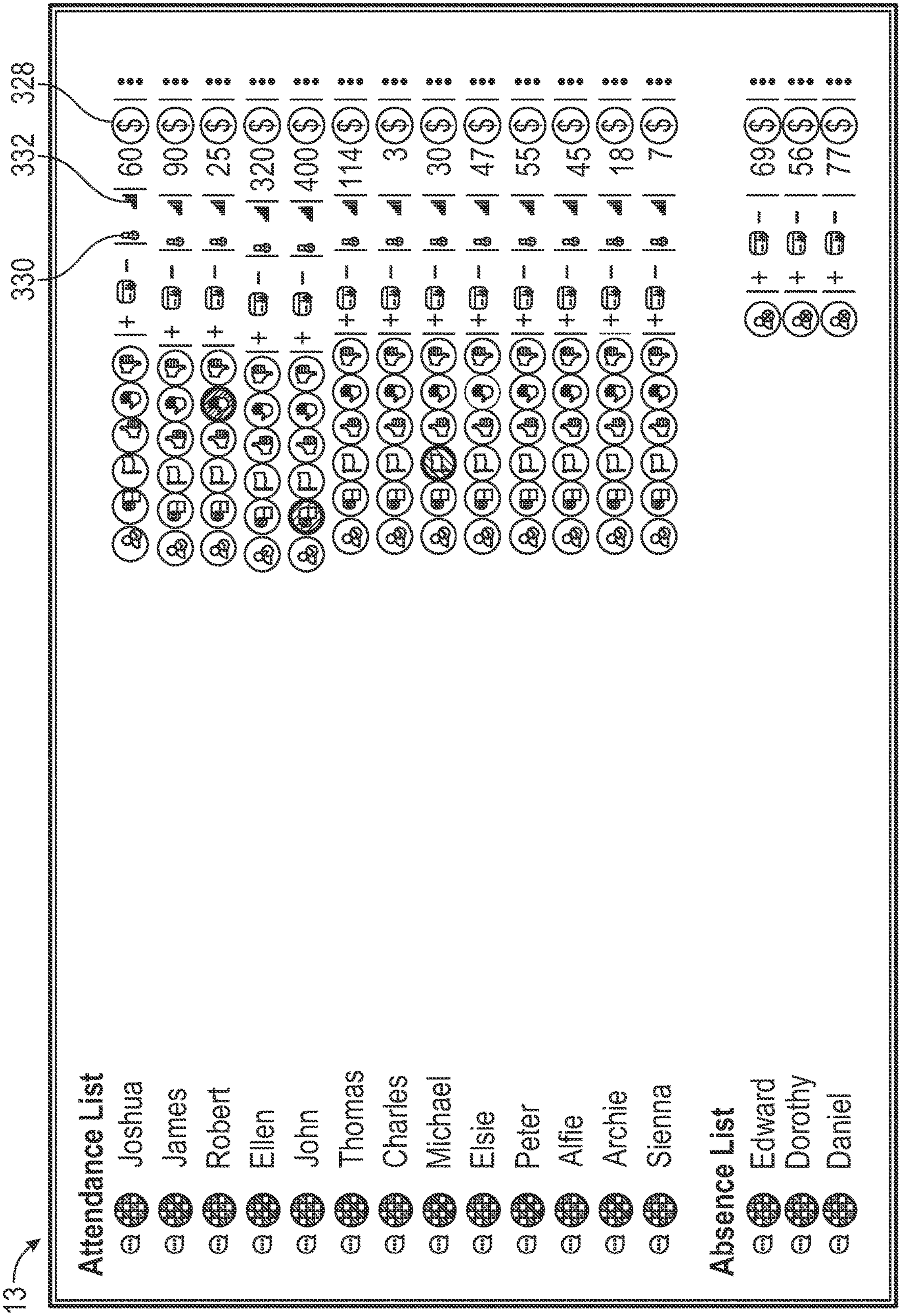
FIG. 11 is a drawing which illustrates a user interface of a facilitator control device wherein attendance and absences of students for a class are illustrated, along with information about each of those students.
Figure 12:
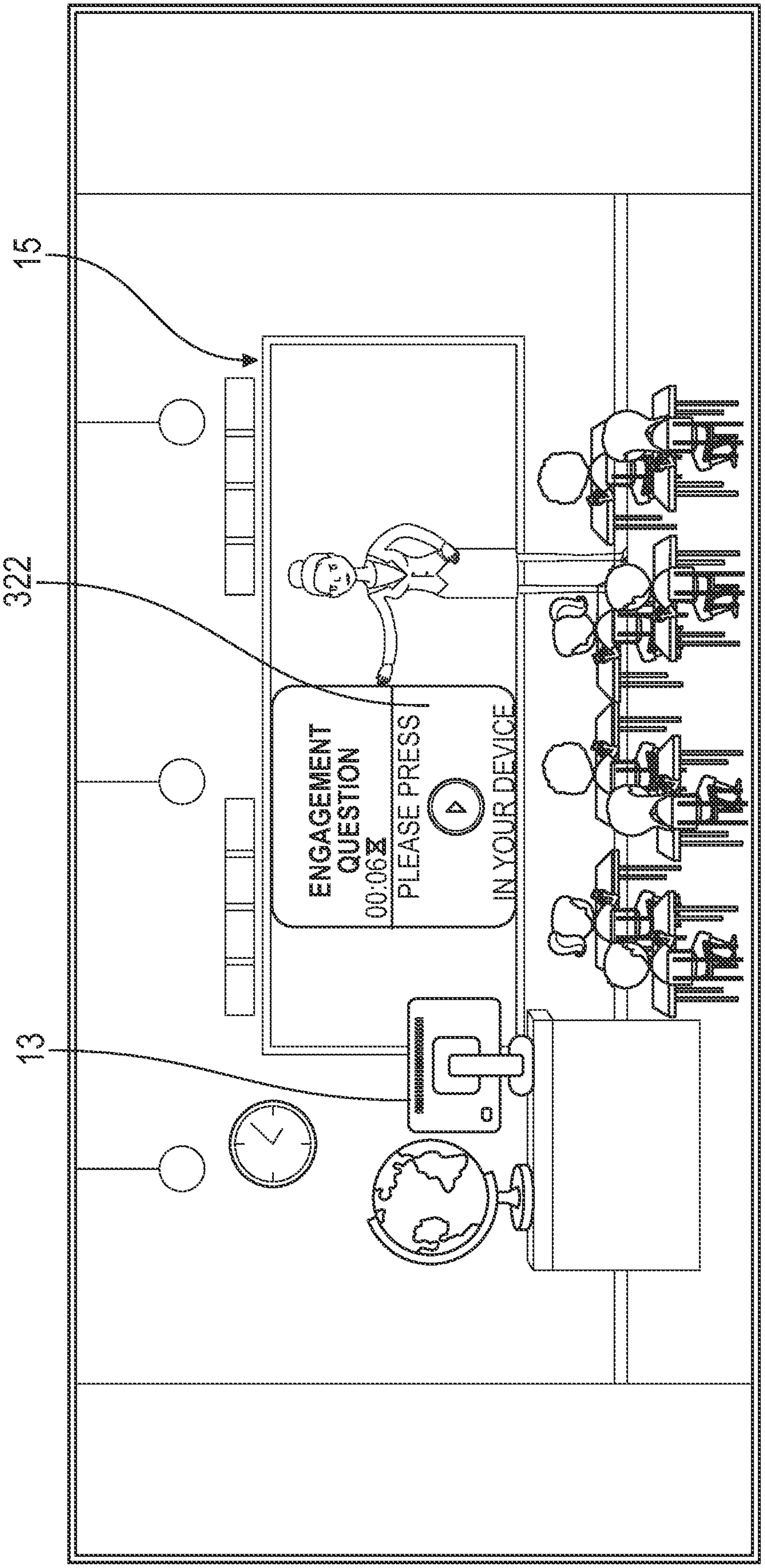
FIG. 12 is a drawing which illustrates an embodiment of the present invention in use in a classroom of students with an engagement prompt displayed.

Upon obtaining the attendance indicia, application 313 preferably updates database 11 to indicate that the student is in attendance. FIG. 11 illustrates an example of an attendance/absence list for a class that can be displayed on a facilitator control device 13 (occasionally referred to herein as an instructor display). Application 313 then preferably also presents a class engagement user interface to the student (see FIG. 7, which illustrates an example of a class engagement user interface being displayed on a participant device 12).

Figure 7:
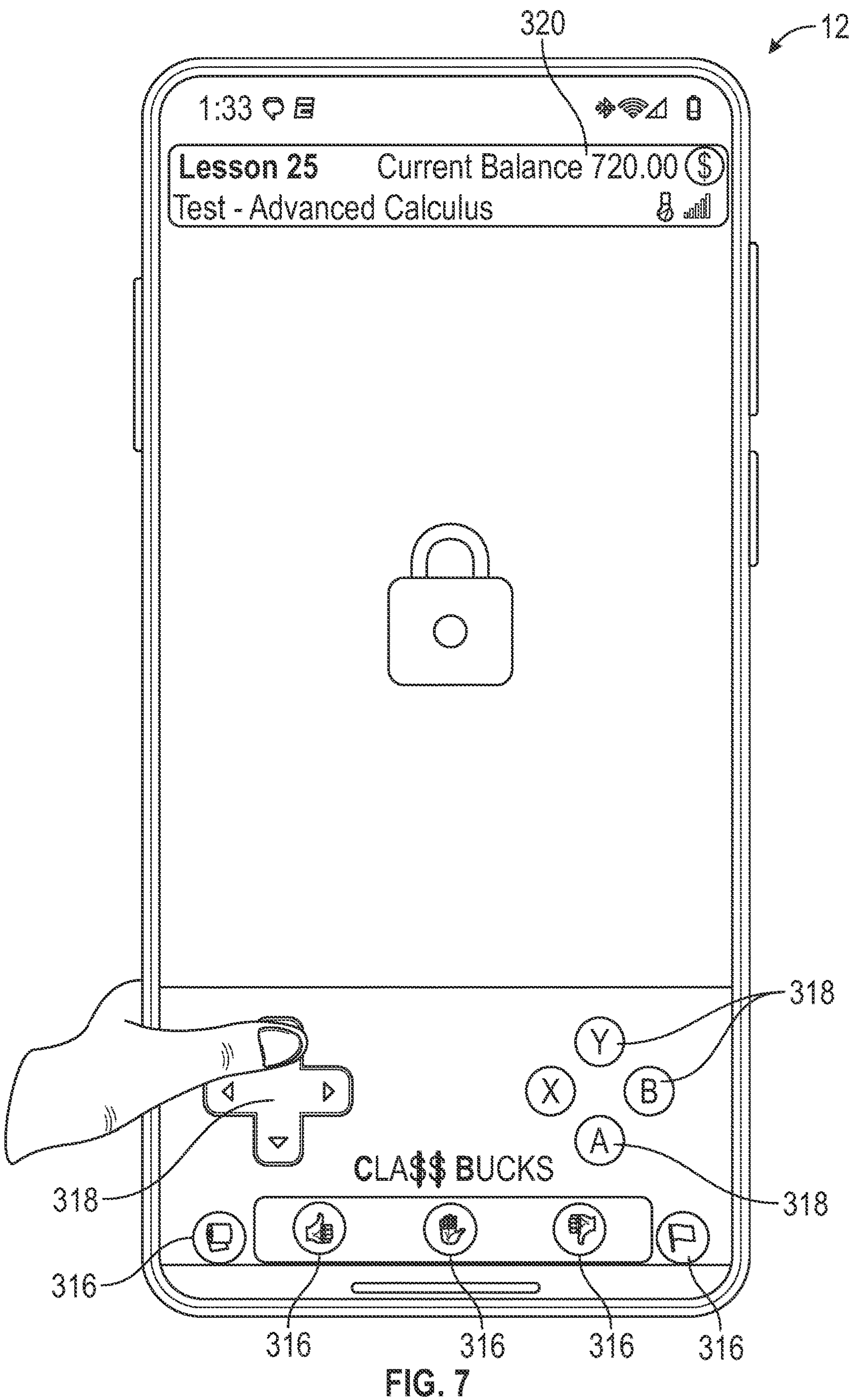
FIG. 7 is a drawing which illustrates a user interface of a participant device wherein a user is pushing an up-button according to the present invention.

As can be seen in FIG. 7, a user interface of participant device 12 preferably includes one or more instructor notifications 316 whereby upon activation, the instructor will be notified, most preferably privately, on facilitator control device 13. In one embodiment, facilitator control device 13 can include a display that is viewable by instructor 308, which can include for example an instructor's computer monitor, tablet, or smartphone. In one embodiment, some of the possible instructor notifications can include an alert that a student needs to go to the restroom, an alert to simulate a student raising his or her hand such that the instructor will call upon the student, indicia to simulate "yes" and "no" responses, an alert to flag the student to the instructor such that the instructor can confer privately with the student. When an instructor alert is activated by a student, application 313 preferably causes a corresponding notification to be displayed or otherwise updated on facilitator control device 13 (see for example FIG. 11 which illustrates an example of a facilitator control device showing class summary data and wherein Robert has simulated raising his hand, John has indicated that he needs to go to the restroom, and Michael has flagged that he needs to speak with the instructor privately).

Figure 8A:
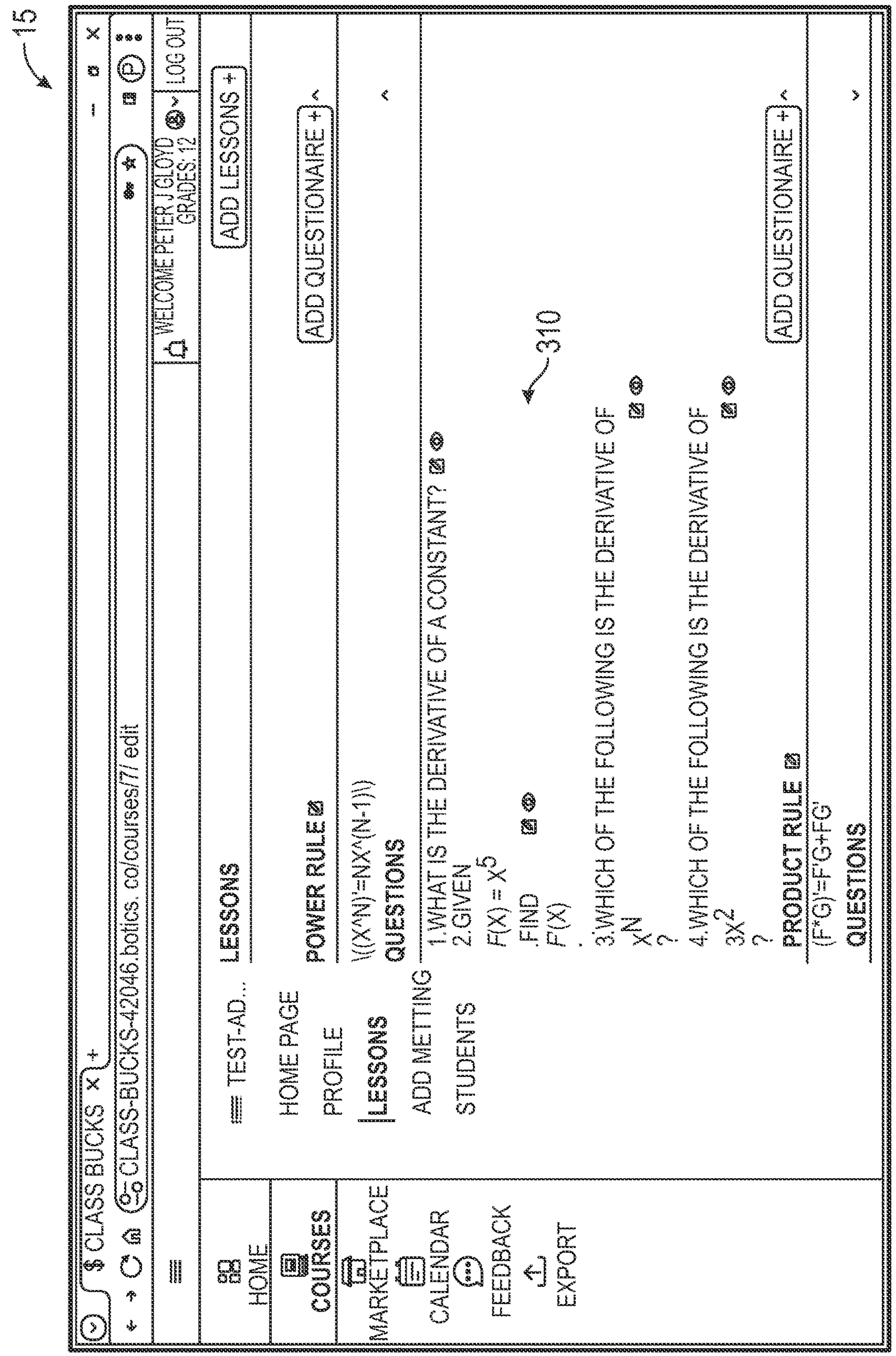
FIG. 8A is a drawing which illustrates a presentation view device with a math lesson being displayed thereon according to the present invention.

As further illustrated in FIG. 7, a user interface of participant device 12 preferably also includes a plurality of other user inputs 318. The one or more students can use inputs 318 to answer questions and/or otherwise engage in activity 310. FIG. 8A illustrates a math lesson that is being taught on a smartboard. The students can thus learn the math lesson by observing the instructor and the information displayed on the smartboard.

Figure 8B:
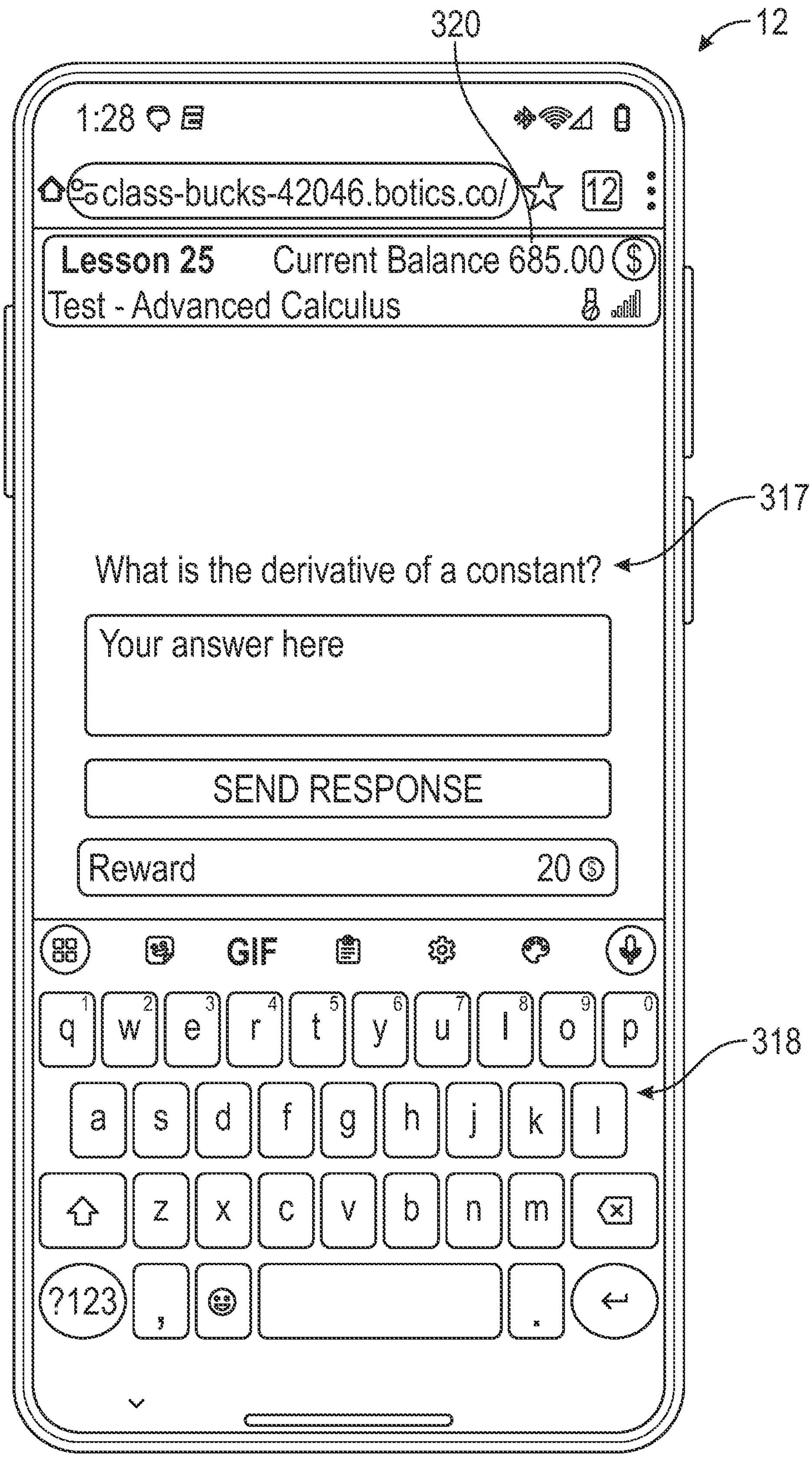
FIGS. 8B and 8C respectively illustrate a user interface of a participant device, according to an embodiment of the present invention, wherein a question is being presented to the user (8B) and wherein a user has received Class Bucks in response to the question being properly answered (8C)

As illustrated in FIG. 8B, periodically, questions 317 can be pushed out to participant devices 12 such that students can be asked a question and can be prompted to enter an answer to the question. When such a question is presented to the user that requires a user input that is different from user inputs 318, the user interface can be updated to include other user inputs 318, which are more appropriate for answering the particular question that is being asked. Optionally, the amount of class bucks awarded can be at least partially based on how long it took the student to answer—which can include for example awarding class bucks to the first number of students to answer correctly (i.e. the first 3 students to answer get class bucks).

Figure 8C:
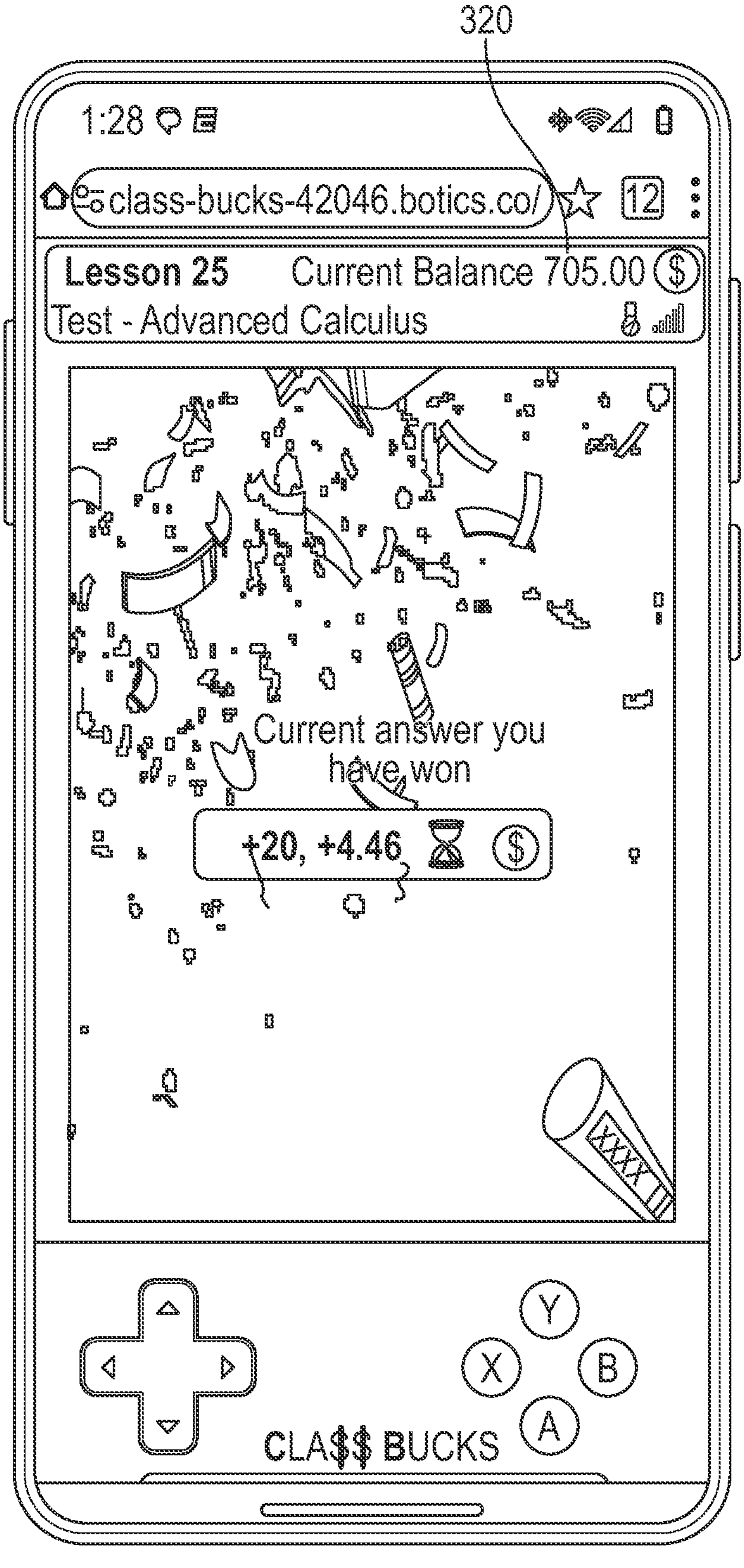

In one embodiment, reward tokens, also occasionally referred to herein as "class bucks" can be awarded to students in response answering questions correctly and/or for other achievements. Accordingly, system 10 can thus also function as a financial literacy teaching tool. Thus, application 313 of system 10 thus can include the ability to track and display and add and subtract class bucks and adjust and maintain an accounting of class bucks for each student. In addition to awarding class bucks for achievements, system 10 can include the ability for an instructor to charge students "rent" and/or use fees or other charges. For example, an instructor can offer an additional 10 minutes of time to complete a quiz for a number of tokens, or can charge a daily, weekly, or monthly "rent" that the student is responsible for paying from their running account balance. System 10, thus has the ability to subtract these various payments from student's accounts. Likewise, students can use the tokens to barter and/or exchange goods and/or services. In one embodiment, various tables, desks, and/or chairs can be regarded as "properties" and if unowned, students can "purchase" such properties and can then charge rent payments from students who sit at those tables. Accordingly, if a first student needs to pay "rent" to another student, the first student can interact with the user interface of application 313 in such a way that the payment is made from the first student and is credited to the running account balance of tokens of the second student. In one embodiment, the current account balance 320 of such tokens can be displayed at a top of a user interface on participant device 12 for each respective student. FIG. 8C illustrates an example of how a user display can appear in response to a user having earned tokens in for answering a question correctly (for example, simulated confetti being launched across the user's screen). The user's current account balance 320 is preferably also updated automatically when tokens are earned or spent.

To monitor student engagement and otherwise ensure that students are paying attention in class, periodically, engagement prompt 322 can be displayed on presentation view device 15 (occasionally referred to herein as a class display, which can optionally include electronically-updatable class display), which can for example instruct students to perform a predetermined action or to otherwise press a user input 318. For example, the smartboard can flash an instruction for students to press an "up" arrow button on their participant device 12, and as illustrated in FIG. 7, the students who are paying attention to the smartboard and see that can instantly press the up-arrow on their participant device. The application then transmits data that indicates that the user either pushed the corresponding button or is otherwise paying attention. This will cause the attention "engagement" of the student to be updated and/or otherwise logged. The instructor can review, in real time or as past data, the engagement of any individual student or of the class as a whole.

Figure 9:
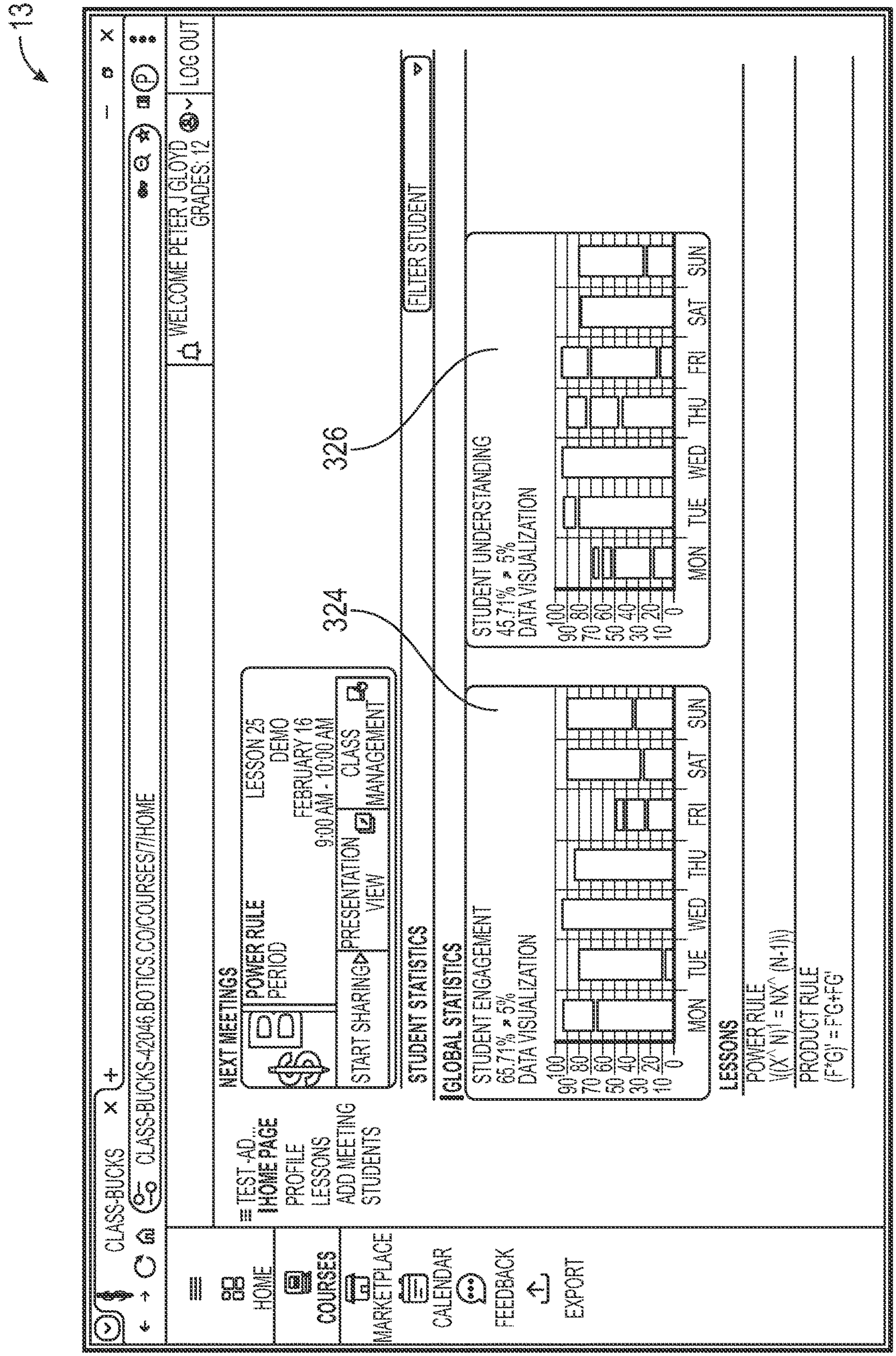
FIGS. 9 and 10 are drawings which respectively illustrate a user interface of a facilitator control device wherein student engagement and student understanding summaries are presented for a class according to the present invention.
Figure 10:
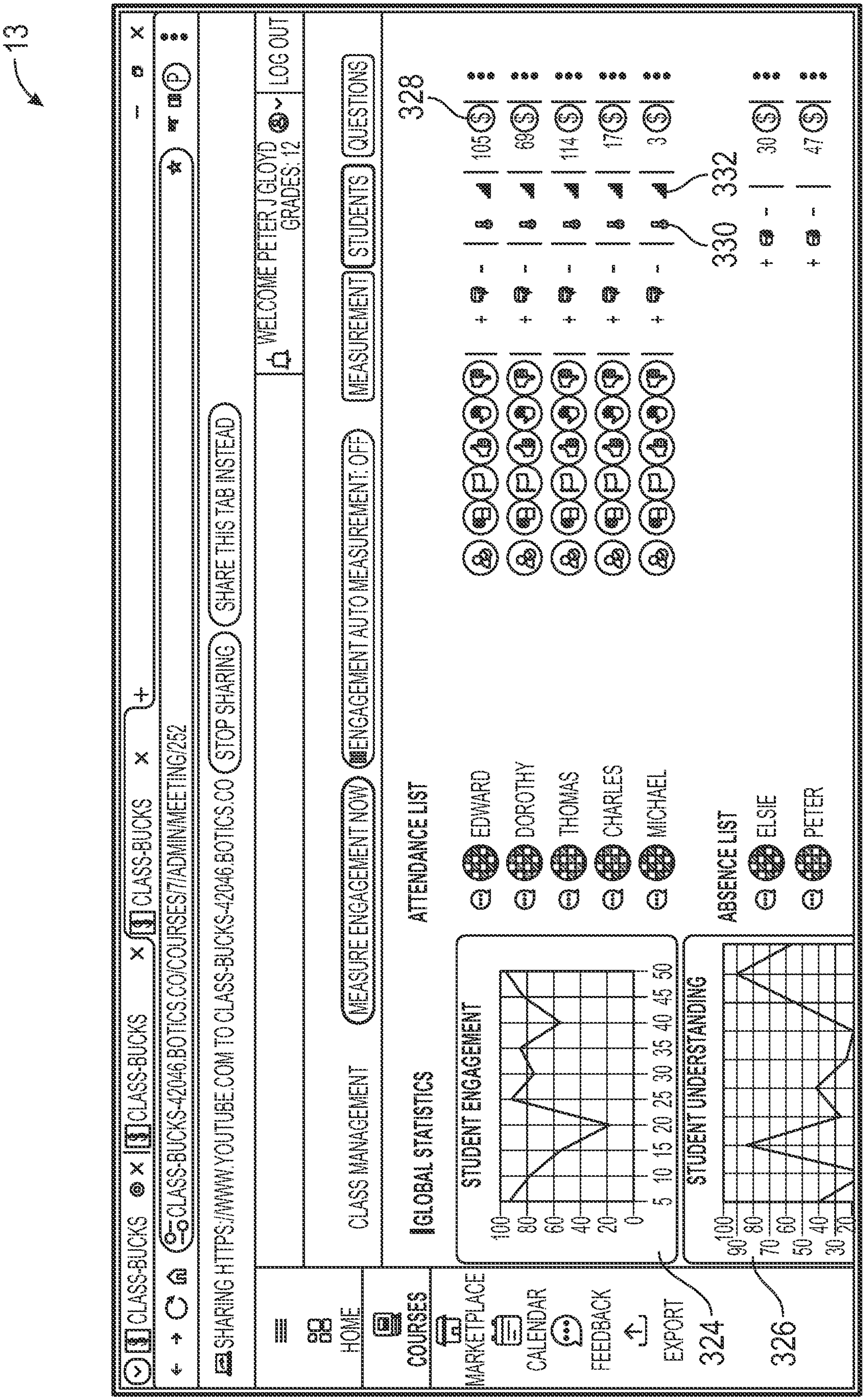

FIG. 9 illustrates a view of a facilitator control device 13 for a math lesson on the "power rule". As can be seen, not only is the student engagement summary 324 displayed, but the results of any questions that have been pushed out to the participant devices can also be illustrated as student understanding summary 326 to show current and/or past understanding as determined based on correct answers to questions. In one embodiment, the instructor can selectively issue an engagement prompt 322. Optionally, system 10 can automatically periodically issue an engagement prompt 322. In one embodiment, the engagement prompt can be automatically periodically issued (which can include for example at random times), and an instructor can also issue engagement prompts whenever the instructor desires. In one embodiment, students can be awarded tokens in response to correctly responding to an engagement prompt within a predetermined amount of time. With the ability to monitor the level of student engagement and student understanding in real time and historically, instructors can adjust their teaching styles and/or content and can instantly see if student engagement and/or understanding is improved, thus providing the instructor with a tool to improve the effectiveness of their teaching style, delivery method, and/or content. FIG. 10 illustrates an alternative view of facilitator control device 13 wherein student engagement summary 324 and student understanding summary 326 are illustrated as graphs. As can be seen in this view, individual student values of tokens can also be displayed as token count 328. Still further, application 313 can be configured to collect and report back information about each individual participant device, including for example battery charge level 330 and/or network connection signal strength 332. By being able to monitor the battery and signal strength of each participant device 12, the instructor can know if any students are unable to participate due to poor signal strength or because their battery has died. FIG. 11 also shows an alternative view of data that can be presented to the instructor via facilitator control device 13.

In one embodiment, at least one or more of the students can be remote from the instructor—for example one or more students can be at a location other than the room in which the instructor is located. In this embodiment, instead of class display 15 being viewable simultaneously by all students, class display 15 can instead be a display that is proximate to the student. Optionally, blended learning can be provided such that at least one student is receiving in-person instruction from the instructor within the same room as the instructor while at least one other student is remote from the instructor. In one embodiment, an instructor need not be present and instead, students can learn by observing a lesson that is being displayed on class display 15. In one embodiment, some or all of the students can be gathered together in a single room with a single class display while the instructor is remote from the students. In this embodiment, the instructor display 13 can be at the instructor's location. In one embodiment, a group of students can share a participant device. Optionally, for example, a class can be broken up into groups of students and the students of each respective group can share a respective participant device.

The preceding examples can be repeated with similar success by substituting the generically or specifically described components and/or operating conditions of embodiments of the present invention for those used in the preceding examples.

Optionally, embodiments of the present invention can include a general or specific purpose computer or distributed system programmed with computer software implementing steps described above, which computer software may be in any appropriate computer language, including but not limited to C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Embodiments of the present invention provide a technology-based solution that overcomes existing problems with the current state of the art in a technical way to satisfy an existing problem for facilitators and participants of learning management systems. An embodiment of the present invention is necessarily rooted in computer technology in order to overcome a problem specifically arising in the realm of computers. Embodiments of the present invention achieve important benefits over the current state of the art, such as increasing the quality of reporting in learning management systems and the efficiency and quality of data exchanged between devices of learning management systems.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Embodiments of the present invention can include every combination of features that are disclosed herein independently from each other, including between the various examples. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguration of their relationships with one another.

What is claimed is:

1. A blended teaching method comprising:

an instructor providing live, in-person, instruction to a plurality of students;

at least periodically displaying an engagement prompt to the plurality of students on an electronically-updatable class display that is visible by the plurality of students;

the engagement prompt comprising an action instruction displayed on the electronically-updatable class display that instructs the plurality of students to perform an action in response to the engagement prompt;

the plurality of students communicating with the instructor via a respective one of a plurality of participant devices;

one or more of the plurality of students performing an action on the respective one of the plurality of participant devices to demonstrate that the one or more of the plurality of students are paying attention to class instructions, which action corresponds to the displayed action instruction of the engagement prompt and is responsive to the engagement prompt;

an instructor display, viewable by the instructor, displaying communications from the plurality of students;

capturing inputs from the one or more of the plurality of students performing the action and making a determination of whether the one or more of the plurality of students are paying attention based at least in part on an amount of time taken by each of the one or more of the plurality of students to perform the action after the engagement prompt was displayed and whether each of the one or more of the plurality of students performed the correct action, wherein the correct action is not dependent on the plurality of students knowing the content of a lesson plan;

and, wherein at least periodically displaying an engagement prompt comprises at least one of:

randomly displaying the engagement prompt, automatically displaying the engagement prompt, and displaying, the engagement prompt upon instructor command;

wherein the content of the engagement prompt is unrelated to the lesson plan the instructor is providing at the time the engagement prompt is displayed;

updating indicia of a level of class attention based on determinations of whether the one or more of the plurality of students are paying attention;

displaying student attention on the instructor display, wherein student attention is determined based at least in part on a past average of prior responses of a respective student;

displaying the level of class attention on the instructor display; and displaying another indicia on the electronically-updatable class display and the plurality of students each using the respective one of the plurality of participant devices to obtain an image of the other indicia or to otherwise scan the other indicia, and making a determination that a respective student is in attendance based on the image or the scan.

2. The blended teaching method of claim 1 wherein the action instruction comprises a predefined action instruction.

3. The blended teaching method of claim 1 wherein at least periodically displaying an engagement prompt to the plurality of students on an electronically-updatable class display comprises at least periodically displaying the engagement prompt to the plurality of students on a smart board.

4. The blended teaching method of claim 1 further comprising the plurality of participant devices using an application or a web service that enables user inputs from each respective one of the plurality of participant devices to be reported to an instructor display and/or otherwise stored in a database.

5. The blended teaching method of claim 1 wherein the method includes using an application or a web service on at least some of the plurality of participant devices.

6. The blended teaching method of claim 1 wherein the method includes software as a service for capturing information from at least some of the plurality of participant devices.

7. The method of claim 1 wherein the plurality of students communicating with the instructor via a respective one of a plurality of participant devices comprises the plurality of students communicating with the instructor via a respective one of a plurality of smartphones.

8. The method of claim 1 wherein the method is implemented at least partially via computer software stored in a non-transitory computer readable media such that data is collected from the plurality of participant devices and a database is updated and such that data from the database is presented on the instructor display.

9. The method of claim 8 wherein the software further causes the electronically-updatable class display to display the engagement prompt.

10. The method of claim 8 wherein the computer software causes the electronically-updatable class display to display the engagement prompt in response to the instructor initiating the display of the engagement prompt.

11. The method of claim 1 wherein the method further comprises computer software stored in a non-transitory computer readable media which facilitates communications between the plurality of participant devices, the electronically-updatable class display and the instructor display.

12. The method of claim 1 wherein displaying the other indicia comprises displaying a first other indicia for less than five seconds before then displaying a second other indicia, the first other indicia being different from the second other indicia.

13. The method of claim 1 wherein the other indicia comprises a quick-response code.

14. The method of claim 1 further comprising electronically awarding tokens to at least one of the plurality of students in response to answering a question correctly.

15. The method of claim 1 further comprising maintaining a running balance of tokens held by each respective one of the plurality of students.

16. The method of claim 15 comprising allowing each of the plurality of students to transfer one or more tokens from the student's respective running balance of tokens to a running balance of tokens held by a different student.

17. The method of claim 1 wherein displaying student attention on the instructor display is done in real-time.

18. The method of claim 1 wherein displaying the level of class attention on the instructor display is done in real-time.

19. The method of claim 1 wherein the electronically-updatable class display is proximate to each of the plurality of students and is remote to the instructor.

* * * * *